United States Patent
Yamaguchi

(10) Patent No.: US 6,701,007 B1
(45) Date of Patent: Mar. 2, 2004

(54) IMAGE PROCESSING DEVICE, IMAGE PROCESSING METHOD, AND RECORDING MEDIUM FOR CORRECTING COLOR BALANCE OF OUTPUT IMAGES

(75) Inventor: Hiroshi Yamaguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/522,612

(22) Filed: Mar. 10, 2000

(30) Foreign Application Priority Data

Mar. 11, 1999 (JP) .......................... 11-064961
Jan. 14, 2000 (JP) ....................... 2000-005616

(51) Int. Cl.$^7$ .............. G06K 9/00; G03F 3/08
(52) U.S. Cl. ............ 382/162; 382/165; 382/167; 358/518; 358/520
(58) Field of Search ............. 382/162, 165, 382/167, 275; 358/1.9, 509, 518, 520, 521, 527, 531; 355/38, 40; 348/223.1; 399/1

(56) References Cited

U.S. PATENT DOCUMENTS

| | | | |
|---|---|---|---|
| 5,206,686 A | * | 4/1993 | Fukui et al. ................... 399/1 |
| 5,719,661 A | * | 2/1998 | Terashita ...................... 355/38 |
| 5,748,287 A | * | 5/1998 | Takahashi et al. ............. 355/40 |
| 5,781,315 A | | 7/1998 | Yamaguchi |
| 6,243,133 B1 | * | 6/2001 | Spaulding et al. ....... 348/223.1 |
| 6,462,835 B1 | * | 10/2002 | Loushin et al. .............. 358/1.9 |

FOREIGN PATENT DOCUMENTS

| | | |
|---|---|---|
| JP | A5297473 | 11/1993 |
| JP | A983825 | 3/1997 |

* cited by examiner

Primary Examiner—Andrew W. Johns
Assistant Examiner—Amir Alavi
(74) Attorney, Agent, or Firm—Birch, Stewart, Kolasch & Birch, LLP

(57) ABSTRACT

An image processing method comprising the steps of: (a) on the basis of image data expressing a single original image recorded on a photographic film, determining an image characteristic value of the original image and, on the basis of the determined image characteristic value, extracting from the image data gray candidate pixels which have a high possibility of being pixels corresponding to gray portions of an object, the determination and extraction being carried out for each of a plurality of original images recorded on the photographic film; and (b) estimating gray balance on the basis of distribution on a predetermined coordinate system of a group of gray candidate pixels which group comprises the gray candidate pixels respectively extracted from the plurality of original images. Accordingly, the gray balance is estimated in an accurate and stable manner from the image data of the original image recorded on the photographic film.

18 Claims, 14 Drawing Sheets

○ GRAY CANDIDATE PIXELS OF ONE
　PHOTOGRAPHIC FILM (24 FRAMES)
　(WEIGHTING FROM HIGHLIGHT-SHADOW
　AXIS/WEIGHT DECREASE AS COLOR
　BECOMES PALER)

× GRAY CANDIDATE PIXELS OF ONE
　FRAME

○ GRAY CANDIDATE PIXELS OF ONE
  PHOTOGRAPHIC FILM (24 FRAMES)
  (WEIGHTING FROM HIGHLIGHT-SHADOW
  AXIS/WEIGHT DECREASE AS COLOR
  BECOMES PALER)

× GRAY CANDIDATE PIXELS OF ONE
  FRAME

○ GRAY CANDIDATE PIXELS OF ONE
 PHOTOGRAPHIC FILM (24 FRAMES)
 (WEIGHTING FROM HIGHLIGHT-SHADOW
 AXIS/WEIGHT DECREASE AS COLOR
 BECOMES PALER)

× GRAY CANDIDATE PIXELS OF ONE
 FRAME

○ GRAY CANDIDATE PIXELS OF ONE PHOTOGRAPHIC FILM (24 FRAMES) (WEIGHTING FROM HIGHLIGHT-SHADOW AXIS/WEIGHT DECREASE AS COLOR BECOMES PALER)

× GRAY CANDIDATE PIXELS OF ONE FRAME

IMAGE PROCESSING DEVICE, IMAGE PROCESSING METHOD, AND RECORDING MEDIUM FOR CORRECTING COLOR BALANCE OF OUTPUT IMAGES

BACKGROUND OF THE INVENTION

1. Field of the Invention

The present invention relates to an image processing device, an image processing method, and a recording medium, and in particular, to an image processing method in which the gray balance of an original image recorded on a photographic film is estimated, an image processing device to which this image processing method is applied, and to a recording medium on which is recorded a program for operating a computer as the image processing device.

2. Description of the Related Art

The color balance of an image which is made visible on a photographic film by carrying out processings such as development for a photographic film with an object photographed and recorded thereon by a camera or the like (hereinafter simply referred to as an image recorded on the photographic film) is influenced by characteristics of the photographic film itself, processing conditions for developing processing, and the like (hereinafter generically referred to as film characteristics) and is deviated or biased from the color balance of the object at the time of photographing. Therefore, when the image recorded on the photographic film is recorded onto a recording material such as a photographic printing paper or is displayed on display means such as a display, the color balance of the image to be recorded onto the recording material or the image to be displayed on the display means (hereinafter generically referred to as the output images) must be corrected such that the color balance of the output image corresponds to the color balance of the object at the time of photographing (such that gray portions of the object at the time of photographing are reproduced as gray in the output image).

As an example of methods of correcting the color balance of output images, a method is known in which pixels corresponding to highlight regions of an image (i.e., an original image) recorded on a photographic film (e.g., pixels having a maximum density in a negative image, and pixels having a minimum density in a positive image) are assumed to be white, while pixels corresponding to shadow regions of the original image (e.g., pixels having a minimum density in the negative image, and pixels having a maximum density in the positive image) are assumed to be black. The gray balance representing the color balance, in the original image, of gray portions of the object at the time of photographing is estimated, and the color balance of an output image is corrected on the basis of the estimated gray balance. In this method, pixels corresponding to highlight regions and pixels corresponding to shadow regions are respectively extracted from the original image. Then, for example, an axis which connects, by a straight line, the points on an RGB density coordinate system which correspond to both of the pixels is determined as the gray axis representing the gray balance.

However, in the aforementioned correction method, when the color of the pixels corresponding to the highlight regions in the original image is not white, as can be seen, for example, in an image in which a person has been photographed by using an electronic flash and cheek portions of the person's face (i.e., flesh-colored portions) are highlighted, the gray axis representing the appropriate gray balance cannot be determined (the same holds for the shadow regions). Further, the color balance of the output image deviates to a complementary color for the color of the pixels corresponding to the highlight regions. This deviation is referred to as "highlight failure". The frequency of generation of an original image susceptible to the above-mentioned highlight failure is relatively high, and a drawback arises in that the probability of obtaining an output image with an appropriate color balance is low.

Further, a method is also known in which, on the basis of Evans' theory, an image having a constant LATD (i.e., light accumulated transmission density) for each of component colors (e.g., R, G, and B) is regarded as an image whose color balance corresponds to the color balance of an object at the time of photographing (i.e., an image having an appropriate gray balance), and the LATD for each of the component colors (e.g., R, G, and B) of the original image is measured. The color balance of an output image is corrected so that the LATD for each of the component colors of the output image becomes constant.

However, in the aforementioned correction method, in a case in which a non-gray region having a substantially constant hue (e.g., a region corresponding to green turf, blue sky, blue sea, or the like) occupies a relatively wide area of the original image, when correction is carried out so that the LATD for each of the component colors becomes constant, the color balance of the output image deviates to the complementary color of the aforementioned region (this deviation is referred to as "color failure"). The frequency of generation of an original image susceptible to the above-described color failure is relatively high. Therefore, a drawback arises in that, as in the case with the other correction method described above, the probability of obtaining an output image with an appropriate color balance is low.

Moreover, Japanese Patent Application Laid-Open (JP-A) No. 9-83825 discloses a linear transformation technique. In this technique, image data DR', DG', and DB' regarding low saturation pixels is acquired from image data DR, DG, and DB representing an original image. Shadow points DRs, DGs, and DBs and highlight points DRh, DGh, and DBh in the image data DR', DG', and DB' are respectively determined. Regarding one of a pair of the image data (DR', DG') corresponding to each other for each pixel, values in the other are averaged for each of the same values in the one to obtain a set of image data (DR", DG"). Subsequently, a relationship between the densities of the two colors (or R, G) is determined from the set of the image data (DR", DG"), the shadow points (DRs, DGs), and the highlight points (DRh, DGh). On the basis of this relationship, linear transformation is carried out so that at least one of the image data DR and DG is made equal to the other over the entire region thereof.

By excluding data of high saturation pixels from the image data representing the original image from the object of computation, the above-described technique is meant to reduce effects caused by the original image susceptible to color failure. In addition to the high saturation pixels, pixels which are adjacent to the high saturation pixels and whose hue difference with respect to the high saturation pixels is within a predetermined range of values, are also excluded from the object of computation. However, in practice, even if the above-mentioned processes are effected with respect to the original image susceptible to color failure, among the pixels of non-gray regions having a substantially constant hue which occupy a relatively wide area of the original image, many pixels remain without being excluded from the object of computation. Therefore, a drawback arises in that correction accuracy of the color balance for the output image is not sufficient when the original image is susceptible to color failure.

Further, JP-A No. 5-297473 discloses a technique in which a large volume of image information obtained by reading images recorded on various types of photographic films is accumulated and stored for each type of the photographic film, and when an image recorded on a particular type of photographic film is to be recorded by exposing a photographic printing paper, exposure conditions are determined by regarding, as a representation of the gray balance, the color balance corresponding to the average of the image information accumulated and stored with regard to the particular film type.

In the above technique, however, the accuracy of the color balance corresponding to the average of the accumulated and stored image information (i.e., deviation with respect to the gray balance) depends on the contents of the image information accumulated and stored in each exposure device. Therefore, in a case in which the same image is recorded by exposing photographic printing papers using different exposure devices, the color balances of the prints obtained by recording the image by exposing the photographic printing papers are different in the respective exposure devices. Further, even in a case in which an image is recorded by exposing photographic printing papers with the same exposure device, when the same image is recorded by exposing photographic printing papers with a time interval at a plurality of times, such as in printing with image processing and extra printing, there arises a drawback in that the color balances of prints obtained differently with respect to such a time differ from each other because of effects of image information newly stored and recorded during the interval.

SUMMARY OF THE INVENTION

In view of the aforementioned, an object of the present invention is to obtain an image processing device, an image processing method, and a recording medium, in which the gray balance can be accurately and stably estimated from image data of an original image recorded on a photographic film.

In order to achieve the above-mentioned object, a first aspect of the present invention is an image processing device, comprising: extracting means which, on the basis of image data expressing a single original image recorded on a photographic film, determines an image characteristic value of the original image and, on the basis of the determined image characteristic value, extracts from the image data gray candidate pixels which have a high possibility of being pixels corresponding to gray portions of an object, the determination and extraction being carried out for each of a plurality of original images recorded on the photographic film; and estimating means for estimating gray balance on the basis of distribution of a group of gray candidate pixels on a predetermined coordinate system which group comprises the gray candidate pixels respectively extracted from the plurality of original images by the extracting means.

The extracting means according to the first aspect, on the basis of image data expressing a single original image recorded on a photographic film, determines an image characteristic value of the original image and, on the basis of the determined image characteristic value, extracts from the image data gray candidate pixels which have a high possibility of being pixels corresponding to gray portions of an object, the determination and extraction being carried out for each of a plurality of original images recorded on the photographic film. In this way, even if the original image is an image wherein a relatively wide area is occupied by, for example, a non-gray region having a substantially constant hue (i.e., an image susceptible to color failure), the majority of the pixels in the aforementioned region is excluded from the gray candidate pixels, and pixels which have a high possibility of being pixels corresponding to gray portions of the object, i.e., pixels which have a high possibility of expressing the gray balance, are extracted as the gray candidate pixels.

The gray candidate pixels can be extracted in such a manner that, for example, saturation of each of the pixels is used as an image characteristic value of the original image, the saturation of each of the pixels is compared with a predetermined value and high saturation pixels are determined, and pixels remaining after the high saturation pixels have been excluded are regarded as the gray candidate pixels.

Moreover, the following case is also possible. Namely, the maximum density and the minimum density in the original image are respectively extracted for each of the component colors from image data. On a predetermined coordinate system (e.g., a three-dimensional orthogonal coordinate system whose coordinate axes are density values for the respective component colors), a first reference axis is set which connects a density point corresponding to the maximum density and a density point corresponding to the minimum density for each of the component colors. Subsequently, on the basis of the distance on the predetermined coordinate system between a point corresponding to each of the pixels and the first reference axis, pixels whose distance to the first reference axis is relatively large are determined to be high saturation pixels. In this case, the maximum density and the minimum density in the original image are the image characteristic values.

Further, after the high saturation pixels have been extracted in the aforementioned manner, determination is made as to whether hue (or hue and saturation) of pixels existing in the neighborhood of the high saturation pixels on the image approximate that of the high saturation pixels. It is preferable that the pixels determined to be similar in hue to the high saturation pixels are also excluded, as pixels that are not gray candidate pixels. In this way, even if the original image is an image susceptible to color failure, most of the pixels in the aforementioned region are excluded from the gray candidate pixels. In this case, the high saturation pixels and the positions and hue of the respective pixels are the image characteristic values.

Furthermore, the estimating means according to the first aspect estimates the gray balance on the basis of the distribution on the predetermined coordinate system of a group of the gray candidate pixels comprising the gray candidate pixels respectively extracted from a plurality of original images by the extracting means. If an original image whose image contents are liable to cause reduction in estimated accuracy of the gray balance (e.g., an image susceptible to highlight failure or color failure, and the like) is included among the plurality of original images, the gray candidate pixels extracted from the original images may often be pixels which do not express the gray balance.

However, the group of the gray candidate pixels comprises the gray candidate pixels which have been respectively extracted from the plurality of original images recorded on the same photographic film. Therefore, variation in image contents of the plurality of original images are averaged for the entire group of the gray candidate pixels. Even if pixels which are appropriate as the gray candidate pixels (pixels expressing the gray balance) have not been extracted from some of the plurality of original images, the distribution of the group of the gray candidate pixels on the predetermined coordinate system expresses with a high degree of accuracy, on the whole, the gray balance of each of the original images recorded on the photographic film (the gray balance which reflects the film characteristics and the like). This is also confirmed by experiments conducted by the present inventor.

The estimating means estimates the gray balance on the basis of the group of the gray candidate pixels on the predetermined coordinate system. Accordingly, the gray balance can be estimated with a high degree of accuracy from the image data of the original images recorded on the photographic film. Further, in accordance with the first aspect, there is no need to accumulate and store the data of original images which have been processed in the past and use the data at the time of estimating the gray balance. Therefore, mass storage means for storing data is not necessary. The results of estimation of the gray balance from (the plurality of original images recorded on) the same photographic film are made stable (substantially stable all the time) without being affected by the contents of accumulated and stored data.

Specifically, estimation of the gray balance by the estimating means from the distribution of the group of the gray candidate pixels on the predetermined coordinate system can be realized by, for example, determining a characteristic line (which may be a straight line or a curve) from information on the positions of the respective gray candidate pixels, which form the group of the gray candidate pixels, on the predetermined coordinate system by using a technique such as the method of least squares or the like.

Further, at the time a characteristic line expressing the gray balance is determined as in the aforementioned, it is preferable that the extracting means is structured so as to carry out the following processings on each of the original images: after the gray candidate pixels have been extracted, the maximum density and the minimum density are respectively extracted from the gray candidate pixels for each of the component colors; a second reference axis is set which connects a density point corresponding to the maximum density for each of the component colors and a density point corresponding to the minimum density for each of the component colors on the predetermined coordinate system; and, on the basis of the distances on the predetermined coordinate system between points respectively corresponding to the gray candidate pixels and the second reference axis, a weight is applied to the respective gray candidate pixels such that the weight increases as the distance decreases. The characteristic line is preferably determined by taking into consideration the weight applied to the respective gray candidate pixels. In this way, estimated accuracy of the gray balance can further be improved.

The distribution of the group of the gray candidate pixels on the predetermined coordinate system expresses the gray balance, which reflects the film characteristics and the like. In general, however, photographic films have a characteristic in that color formation density changes in a non-linear manner in accordance with the change in the exposure amount, and therefore, the characteristic line expressing the gray balance is expressed as a curve on the predetermined coordinate system. Thus, even at the time of estimating the gray balance by the estimating means, strictly speaking, it is preferable that a characteristic curve expressing the gray balance is determined by subjecting the distribution of the group of the gray candidate pixels on the predetermined coordinate system to non-linear approximation of higher order. However, processings are considerably complicated, and deterioration in estimated accuracy may instead be caused by carrying out non-linear approximation of higher order.

In general, a color formation density area of a photographic film has a density value range of approximately 3.0, while a density area of each original image actually recorded on the photographic film has a density value range of about 1.0. Since the density area of each original image recorded on a single photographic film is unstable, there are often cases in which the group of the gray candidate pixels is distributed on the predetermined coordinate system with a scope corresponding to the color formation density area and this distribution expresses the gray balance over the entirety of the color formation density area of the photographic film. However, information on the gray balance required for each original image at the time of correcting the gray balance is only a part of the entire color formation density area of the photographic film (i.e., the density area of the each original image).

The present inventor, in view of the aforementioned, have achieved a second aspect in which, when a density area of each original image is utilized, the gray balance can be estimated with a high degree of accuracy and in a stable manner, by determining a characteristic line (gray axis) expressing the gray balance by carrying out linear approximation for the distribution of the group of the gray candidate pixels on the predetermined coordinate system.

In the second aspect, for each of the plurality of original images, by subjecting, among the distribution of the group of gray candidate pixels on the predetermined coordinate system, a distribution in a density area of an original image, which is an object of estimation, to linear approximation, the estimating means estimates a gray axis expressing the gray balance in the original image. Therefore, for each of the original images, the gray balance (gray axis) in the density area (the density area of the respective images) required for gray balance correction can be estimated with a high degree of accuracy by simple processings.

A third aspect according to the second aspect is characterized in that the estimating means carries out the linear approximation in such a manner that gradient of the gray axis is within a predetermined range.

Since the gradient of the characteristic line expressing the gray balance on a predetermined coordinate system is determined by the film characteristics and the like, the gradient falls into a certain range in almost all cases. In the present invention according to the third aspect, linear approximation is carried out such that the gradient of the gray axis is within a predetermined range, and therefore, when carrying out the linear approximation, deviation of the gradient of the gray axis from the predetermined range is restricted. Accordingly, for example, even when the gradient of the gray axis, which is determined by linear approximation from the distribution of the group of the gray candidate pixels on the predetermined coordinate system, is extremely increased or decreased for some reason, the estimated accuracy of the gray balance can be prevented from becoming significantly reduced.

A fourth aspect according to the third aspect is characterized in that the estimating means changes the restriction on the gradient of the gray axis in accordance with the number of the original images recorded on the photographic film.

Accuracy of the gray balance which is estimated on the basis of the distribution of the group of the gray candidate pixels on the predetermined coordinate system depends on the number of original images from which the gray candidate pixels have been extracted, i.e., the number of original images recorded on the photographic film. As the number of the original images decreases, the estimated accuracy of the gray balance decreases. In the fourth aspect, the restriction on the gradient of the gray axis is changed in accordance with the number of the original images recorded on the photographic film. Therefore, for example, as the number of the original images recorded on the photographic film decreases (i.e., as the estimated accuracy of the gray balance decreases), the restriction on the gradient of the gray axis can be made stricter (i.e., tolerance of the gradient can be made narrow). Regardless of the number of the original images recorded on the photographic film, the gray balance can be estimated with an accuracy of a predetermined value or more.

A fifth aspect according to the third aspect is characterized in that the estimating means changes the restriction on the gradient of the gray axis in accordance with the number of the gray candidate pixels extracted from the image data.

As described above, the distribution of the group of the gray candidate pixels on the predetermined coordinate system represents the gray balance which reflects the film characteristics and the like. The accuracy of the gray balance represented by the distribution of the group of the gray candidate pixels is correlated with the number of the gray candidate pixels which form the group of the gray candidate pixels. As the number of the gray candidate pixels which have been extracted from image data decreases, the accuracy of the gray balance represented by the distribution of group of the gray candidate pixels decreases. In accordance with this decrease, the estimated accuracy of the gray balance on the basis of the distribution of the group of the gray candidate pixels also decreases.

With regard to the above, in the present invention according to the fifth aspect, the restriction on the gradient of the gray axis is changed in accordance with the number of the gray candidate pixels which have been extracted from image data. Therefore, for example, as the number of the gray candidate pixels which have been extracted from image data decreases (i.e., as the estimated accuracy of the gray balance decreases), the restriction on the gradient of the gray axis can be made stricter (i.e., tolerance of the gradient can be made narrow). Thus, the gray balance can be estimated with an accuracy of a predetermined value or more regardless of the number of the gray candidate pixels which have been extracted from image data.

A sixth aspect according to the third aspect is characterized by further comprising designating means for designating the restriction on the gradient of the gray axis, wherein the estimating means changes the restriction on the gradient of the gray axis in accordance with a designation by the designating means.

A so-called surface exposure method is a method in which an image is recorded on a recording material by irradiating light on a photographic film such that the light transmitted through the photographic film exposes a recording material such as a photographic printing paper. When an image is recorded using the surface exposure method, density correction with respect to a recorded image which corresponds to parallel displacement of the exposure amount-color forming density characteristics along the density axis can be realized by changing the amount of insertion of a light adjustment filter onto an optical path. However, it is difficult to carry out density correction for the recorded image which corresponds to a change in the gradient of the exposure amount-color forming density characteristics.

Thus, on the basis of the results of estimation of the gray balance, in an aspect in which image data representing an original image is converted into image data having a well-balanced gray balance, and an image is outputted by using the converted image data (i.e., an image is recorded onto a recording material, an image is displayed on display means, image data are stored in an information storage medium, or the like), for example, in a case in which an output image having image quality similar to that obtained in the surface exposure method is desired, it is preferable that, when estimating the gray balance, the variation range of the gradient of the gray axis is small.

Further, as for a photographic film in which original images recorded thereon have undergone time-induced deterioration such as color fading, the film characteristics thereof are considerably different from original film characteristics. Therefore, the gray balance in the original images are considerably different from original gray balance. It is also possible that, if the restriction on the gradient of the gray axis is made strict, the estimated accuracy of the gray balance conversely deteriorates.

With respect to the above, in the present invention according to the sixth aspect, there is provided a designating means for designating the restriction on the gradient of the gray axis, and the restriction on the gradient of the gray axis is changed in accordance with a designation by the designating means. Therefore, for example, when an output image having image quality similar to that obtained in the surface exposure method is desired, by an operator designating, via the designating means, a restriction such that the restriction on the gradient of the gray axis is made strict (i.e., tolerance of the gradient is made narrow), the variation range in the gradient of the gray axis can be made small such that an output image having desired image quality can be obtained. Further, in a case in which the photographic film has undergone time-induced deterioration, by the operator designating, via the designating means, a restriction such that the restriction on the gradient of the gray axis is made lenient (i.e., tolerance of the gradient is made wide), reduction of the estimated accuracy of the gray balance, which is caused by the gray balance of the original image being different from the original gray balance, can be prevented. Accordingly, in accordance with the present invention according to the sixth aspect, estimation of the gray balance can be freely controlled.

A seventh aspect according to the third aspect is characterized in that the estimating means changes the restriction on the gradient of the gray axis in accordance with type of the photographic film.

In general, negative films are designed in such a manner that the exposure amount-color forming density characteristics in a normal exposure region is linear and the gradient thereof is substantially constant mutually among the component colors (i.e., a plurality of characteristic lines are substantially parallel to one another, each characteristic line representing the exposure amount-color forming density characteristics for one of the component colors). However, depending on the film type of negative films, the gradient of the exposure amount-color forming density characteristics may be different for each of the component colors. The gray balance of an original image recorded on such a photographic film is greatly different from the gray balance of an original image recorded on a normal photographic film. Therefore, if the restriction on the gradient of the gray axis is made strict, the estimated accuracy of the gray balance may deteriorate.

With respect to the above, the present invention according to the seventh aspect changes the restriction on the gradient of the gray axis in accordance with the film type of the photographic film. Therefore, for example, in a case where the photographic film on which original images are recorded is the type of film in which the gray balance of original images is greatly different from that of other film types, the restriction on the gradient of the gray axis can be made lenient. As a result, there can be prevented deterioration of the estimated accuracy of the gray balance of the original image recorded on the photographic film of a particular film type.

An eighth aspect according to the third aspect is characterized in that the estimating means changes the restriction on the gradient of the gray axis in accordance with exposure level at which the original image has been recorded by exposing the photographic film.

In general, the exposure amount-color forming density characteristics of a photographic film are linear in a normal exposure region and are non-linear in an underexposure region and an overexposure region. Accordingly, in estimation of the gray axis in the normal exposure region, if the variation range of the gradient of the gray axis is made large (i.e., if the restriction on the gradient of the gray axis is made lenient), the estimated accuracy of the gray balance may deteriorate. Conversely, in estimation of the gray axis in the underexposure region or the overexposure region, if the restriction on the gradient of the gray axis is made strict, the estimated accuracy of the gray balance deteriorates.

With respect to the above, in the present invention according to the eighth aspect, the restriction on the gradient of the gray axis is changed in accordance with the exposure level at which the original image has been recorded by exposing the photographic film. Accordingly, for original images having different exposure regions, the gray balance (the gray axis) in each of the original images can be estimated with a high degree of accuracy.

For example, in a case in which information expressing the exposure level is recorded onto a predetermined information recording section when original images are recorded by exposing the photographic film, the exposure level at which the original images have been recorded by exposing the photographic film can be detected by reading, from the information recording section, information which expresses the exposure level. In addition, the exposure level can be estimated, for example, on the basis of the difference in density between the film-based density and the density of the original images.

In accordance with a ninth aspect of the present invention, there is provided an image processing method comprising the steps of: (a) on the basis of image data expressing a single original image recorded on a photographic film, determining an image characteristic value of the original image and, on the basis of the determined image characteristic value, extracting from the image data gray candidate pixels which have a high possibility of being pixels corresponding to gray portions of an object, the determination and extraction being carried out for each of a plurality of original images recorded on the photographic film; and (b) estimating gray balance on the basis of distribution on a predetermined coordinate system of a group of gray candidate pixels which group comprises the gray candidate pixels respectively extracted from the plurality of original images. Therefore, the gray balance can be estimated in a highly accurate and stable manner from the image data of the original images recorded on the photographic film, as is the case with the first aspect of the present invention.

In accordance with a tenth aspect of the present invention, there is provided a recording medium on which is recorded a program for a computer to execute processings comprising: a first step in which, on the basis of image data expressing a single original image recorded on a photographic film, an image characteristic value of the original image is determined and, on the basis of the determined image characteristic value, gray candidate pixels which have a high possibility of being pixels corresponding to gray portions of an object are extracted from the image data, the determination and extraction being carried out for each of a plurality of original images recorded on the photographic film; and a second step in which gray balance is estimated on the basis of distribution of a group of gray candidate pixels on a predetermined coordinate system which group comprises the gray candidate pixels respectively extracted from the plurality of original images.

On the recording medium according to the tenth aspect, there are recorded the processings including the aforementioned first and second steps, i.e., a program for operating the computer as the image processing device according to the first aspect. Therefore, by the computer reading and executing the program recorded on the aforementioned recording medium, the gray balance can be estimated in a highly accurate and stable manner from the image data of the original images recorded on the photographic film, as is the case with the present invention according to the first aspect (and the ninth aspect).

DESCRIPTION OF THE PREFERRED EMBODIMENTS

Figure 1:
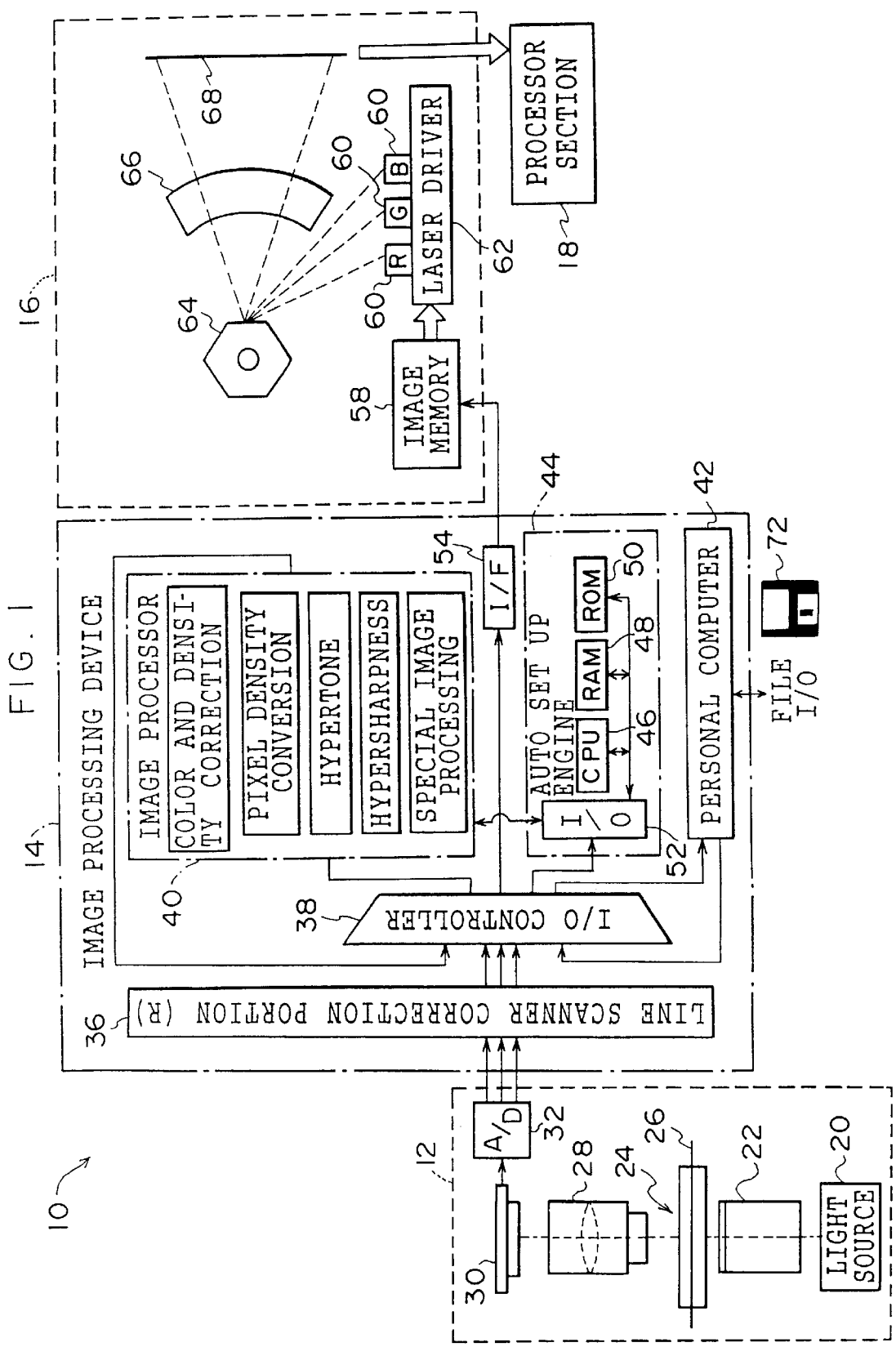
FIG. 1 is a schematic structural view of an image processing system relating to an embodiment of the present invention.

Hereinafter, an embodiment of the present invention will be described in detail with reference to the drawings. FIG. 1 illustrates an image processing system 10 to which the present invention is applied. The image processing system 10 comprises a film scanner 12, an image processing device 14 and a printer 16 which are connected in series.

The film scanner 12 reads a film image (a negative image or a positive image which is made visible by developing processing after photographing of an object, and which corresponds to an "original image" in the present invention) recorded on a photographic photosensitive material such as a photographic film 26 (e.g., a negative film or a reversal film). Hereinafter, the photographic photosensitive material is simply referred to as "photographic film". The film scanner 12 outputs the image data obtained by this reading. Light, which has been emitted from a light source 20 and whose unevenness in terms of the light amount has been reduced by a light diffusing box 22, is illuminated onto the photographic film 26 loaded in a film carrier 24. The light transmitted through the photographic film 26 is focused onto a light-receiving surface of a linear CCD sensor 30 (an area CCD sensor may be used instead) via a lens 28.

The film carrier 24 conveys the photographic film 26 such that the portions on the photographic film 26 at which film images are recorded are sequentially positioned on an optical axis of the light emitted from the light source 20. In this way, the film images recorded on the photographic film 26 are sequentially read by the CCD sensor 30, and signals corresponding to these film images are outputted from the CCD sensor 30. The signals outputted from the CCD sensor 30 are converted into digital image data by an A/D converter 32, and are inputted to the image processing device 14.

A line scanner correction section 36 of the image processing device 14 carries out the following processings in the following order: darkness correction for subtracting the dark output levels of cells corresponding to respective pixels from the inputted scan data (the R, G, B data inputted from the film scanner 12); density conversion for logarithmically converting the data which has been subjected to the darkness correction into data which expresses density values; shading correction for correcting the density-converted data in accordance with unevenness in the light amount of the light illuminated onto the photographic film 26; and defective pixel correction for, among the data subjected to shading correction, interpolating, from data of surrounding pixels, data of cells from which no signals corresponding to the incident light amounts have been outputted (so-called "defective pixels"), and generating new data. Output terminals of the line scanner correction section 36 are connected to input terminals of an I/O controller 38. The data which has been subjected to the aforementioned processings at the line scanner correction section 36 are inputted to the I/O controller 38 as scan data.

An input terminal of the I/O controller 38 is connected to a data output terminal of an image processor 40 such that image data which has been subjected to image processings (which will be described in detail later) is inputted from the image processor 40. Further, another input terminal of the I/O controller 38 is connected to a personal computer 42. The personal computer 42 has an expansion slot (not illustrated). Drivers (not shown) for carrying out data reading and writing from and onto information storage media such as memory cards, CD-Rs, and the like, and communication control devices for communicating with other information processing equipments are connected to this expansion slot. When file image data is inputted from the exterior via the expansion slot, the inputted file image data is inputted to the I/O controller 38.

Output terminals of the I/O controller 38 are respectively connected to a data input terminal of the image processor 40, and to an auto set up engine 44 and the personal computer 42. Further, an output terminal of the I/O controller 38 is connected to a printer 16 via an I/F circuit 54. The I/O controller 38 selectively outputs inputted image data to the aforementioned respective equipments connected to the output terminals of the I/O controller 38.

In the present embodiment, the film scanner 12 reads film images, which are recorded on the photographic film 26, twice, each time at a different resolution. In the first reading, which is carried out at a relatively low resolution (hereinafter, "prescanning"), even when the density of the film image is extremely low (e.g., an underexposed negative image on a negative film), the entire surface of the photographic film 26 is read under reading conditions which have been determined such that there is no saturation of the charge accumulated in the CCD sensor 30. The reading conditions are the light amounts of the respective R, G, B wavelength regions of the light illuminated onto the photographic film 26, and the charge accumulating time of the CCD sensor 30. The data obtained by this prescanning (prescan data) is inputted to the auto set up engine 44 from the I/O controller 38.

The auto set up engine 44 is equipped with a CPU 46, a RAM 48 (e.g., a DRAM), a ROM 50 (e.g., a ROM whose stored contents are rewritable), and an input/output port 52, which are connected together via a bus. On the basis of the prescan data inputted from the I/O controller 38, the auto set up engine 44 determines the frame position of the film image, and extracts data (prescan image data) corresponding to the film image recorded region on the photographic film 26. Further, on the basis of the prescan image data, the auto set up engine 44 determines the size of the film image, computes image characteristic amounts such as density, and determines reading conditions for re-reading of the prescanned photographic film 26 by the film scanner 12 at a relatively high resolution (hereinafter called "fine scanning"). Then, the auto set up engine 44 outputs the frame position and the reading conditions to the film scanner 12.

On the basis of the prescan image data, the auto set up engine 44 carries out computation of an image characteristic amount including the extraction of a main portion within the film image (e.g., a region corresponding to a person's face (a face region)). The auto set up engine 44 automatically determines, by computation, the processing conditions of the respective image processings for the image data (fine scan image data) obtained by the film scanner 12 conducting the fine scanning (this determination of the processing conditions is called "set up computation"), and outputs the determined processing conditions to the image processor 40.

A display, a keyboard, and a mouse (all unillustrated) are connected to the personal computer 42. The personal computer 42 fetches the prescan image data from the auto set up engine 44, and fetches the processing conditions for the image processings determined by the auto set up engine 44. On the basis of the fetched processing conditions, the personal computer 42 subjects the prescan image data to image processings which are equivalent to image processings to be carried out by the image processor 40 on the fine scan image data, and generates simulation image data.

The generated simulation image data is converted into signals for displaying the image on the display, and on the basis of these signals, a simulation image is displayed on the display. Further, an operator verifies the image quality and the like of the displayed simulation image. When information instructing correction of the processing conditions is inputted via the keyboard as the results of the verification, this information is outputted to the auto set up engine 44. In this way, at the auto set up engine 44, processings such as recomputation of the processing conditions of the image processings are carried out.

The image data (fine scan image data), which is inputted to the I/O controller 38 by the film image being fine scanned by the film scanner 12, is inputted to the image processor 40 from the I/O controller 38. The image processor 40 is equipped with image processing circuits for carrying out various types of image processings such as color and density conversion processings including gradation conversion and color conversion; pixel density conversion processing; hypertone processing for compressing the gradation of the super-low frequency brightness components of the image; hypersharpness processing for enhancing the sharpness while suppressing graininess; and the like. With the auto set up engine 44, the inputted image data are subjected to the various image processings in accordance with the processing conditions determined and notified for each image.

In addition to the image processings described above, examples of other image processings which can be carried out at the image processor 40 include the following: sharpness correction or soft focus processing for the entire image or a portion thereof (e.g., the region corresponding to a person's face); image processing for purposely changing the image tone (image processing for finishing the output image in monotone, image processing for finishing the output image in a portrait style, image processing for finishing the output image in a sepia tone, or the like); image processing for editing the image (e.g., image processing to impart a slenderized appearance in the actual image, to a person represented in the original image, image processing for correcting red-eye, and the like); LF aberration correction processing for correcting geometric distortion and color offset caused by distortion aberration and chromatic aberration of magnification of an LF lens for images photographed by using an LF (lens-fitted film package); processing for correcting a reduction in light at peripheral portions of an image, which is due to peripheral light reduction of an LF lens; various types of LF aberration correction processings for correcting reduction in image quality of an output image due to characteristics of an LF lens, such as processing for correcting a reduction in sharpness of an image caused by characteristics of the LF lens; and the like.

When image data which has been subjected to image processings at the image processor 40 is used to record an image onto photographic printing paper, the image data subjected to image processings at the image processor 40 is outputted from the I/O controller 38 via the I/F circuit 54 to the printer 16 as image data for recording. Further, in a case in which the image-processed image data is to be output to the exterior as an image file, the image data is outputted from the I/O controller 38 to the personal computer 42. In this way, at the personal computer 42, the image data inputted from the I/O controller 38 for output to the exterior is outputted via the expansion slot to the exterior (the aforementioned drivers, communication control devices, or the like) as an image file.

The printer 16 is equipped with an image memory 58, R, G, B laser light sources 60, and a laser driver 62 which controls the operation of the laser light sources 60. The image data for recording which has been inputted from the image processing device 14 is temporarily stored in the image memory 58. The image data for recording is read thereafter, and is used to modulate the R, G, B laser light emitted from the laser light sources 60. The laser light emitted from the laser light sources 60 is scanned onto a photographic printing paper 68 via a polygon mirror 64 and an fθ lens 66, such that an image is recorded by exposing the photographic printing paper 68. The photographic printing paper 68 which has been exposed to record an image is sent to a processor section 18 and is subjected to various processings such as color formation, bleach-fixing, washing and drying. In this way, the image which has been recorded by exposing the photographic printing paper 68 is made visible.

Next, operation of the present embodiment will be described. Processing for computing density and color conversion conditions is processing to which the image processing method relating to the ninth aspect of the present invention is applied and which is realized by a program for the density and color conversion conditions being executed by the CPU 46 of the auto set up engine 44. The program for computing the density and color conversion conditions is originally stored in an information storage medium 72 (see FIG. 1), together with programs for implementing other processings at the CPU 46. In FIG. 1, the information storage medium 72 is illustrated as a floppy disk, but the information storage medium 72 may be another information storage medium such as a CD-ROM, a memory card, or the like.

The information storage medium 72 is loaded into an information reading device (not shown) connected to the personal computer 42. When installation of the program into the image processing device 14 from the information storage medium 72 is instructed, the information reading device 14 reads the program for computing the density and color conversion conditions and the like from the information storage medium 72, and stores this program and the like onto a ROM 50 whose stored contents are rewritable.

When the time arrives for executing the processing for computing the density and color conversion conditions (the time when the prescan data has been inputted to the image processing device 14 from the scanner 12 and processings, such as cutting-out of the image data from the prescan data (i.e., the prescan image data), have been completed), the program for computing the density and color conversion conditions is read from the ROM 50 and is executed by the CPU 46. Thereby, the auto set up engine 44 functions as the image processing device relating to the first aspect of the present invention. The information storage medium 72 on which the program for computing the density and color conversion conditions is stored corresponds to the recording medium of the tenth aspect of the present invention.

Figure 2A:
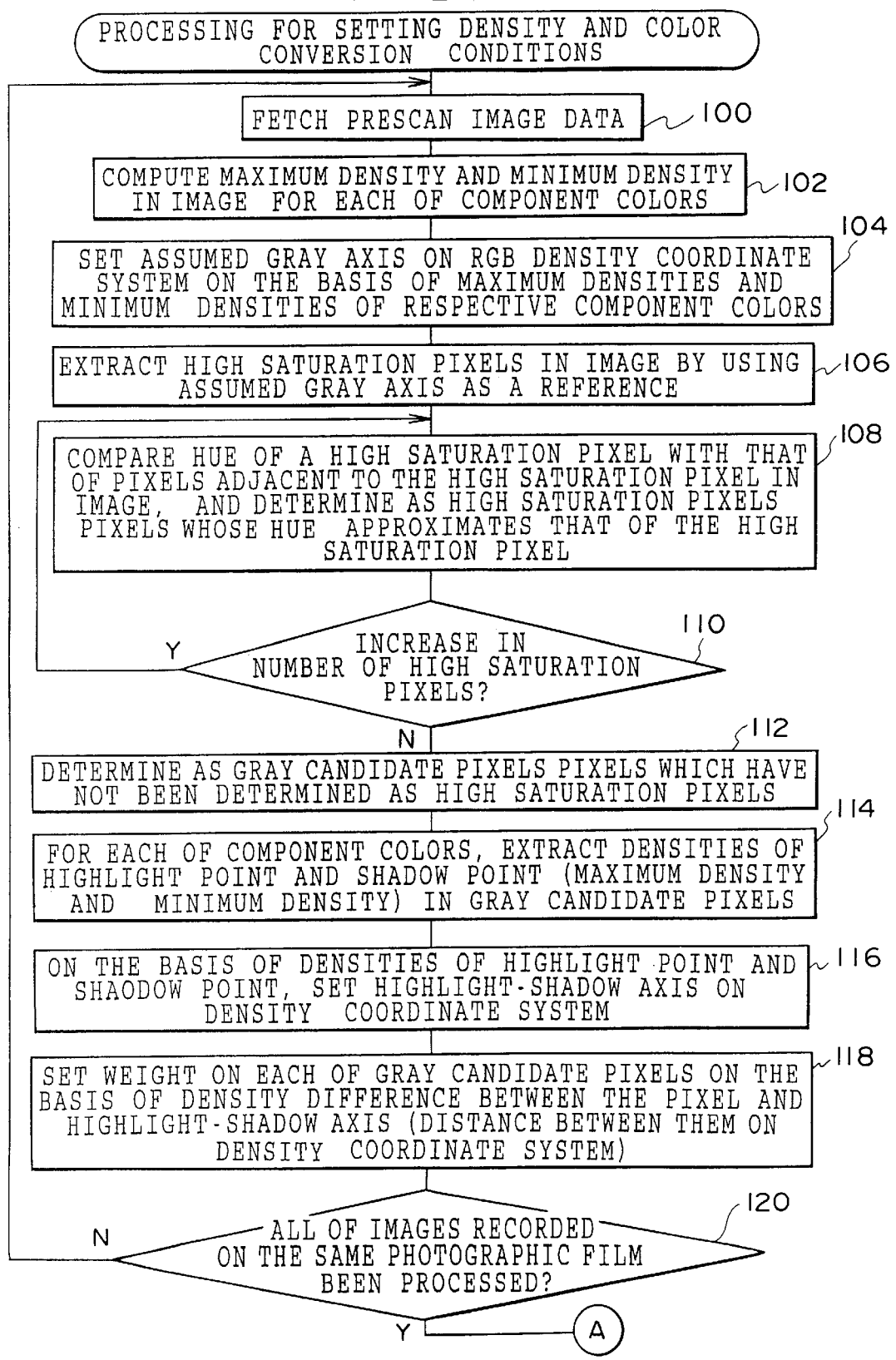
FIGS. 2A and 2B are flow charts showing the contents of processing for setting density and color conversion conditions relating to the embodiment.
Figure 2B:
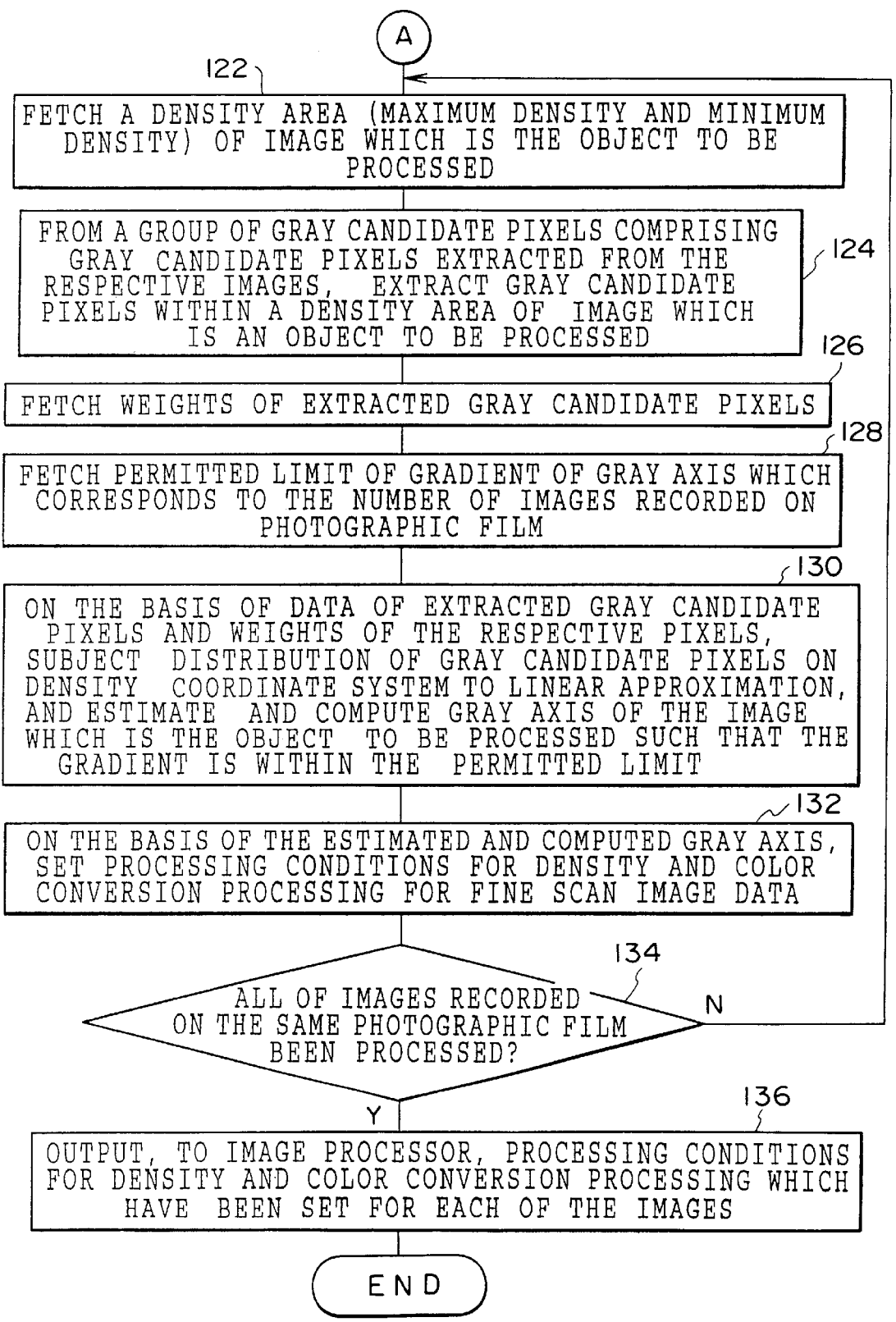

The processing for computing the density and color conversion conditions is processing for computing, for the respective film images recorded on the single photographic film 26, the processing conditions for the density and color conversion processing which is conducted at the image processor 40. Hereinafter, this processing will be described in detail with reference to the flowcharts in FIGS. 2A and 2B. There will be described hereinafter an example of computing the density and color conversion conditions for a negative image recorded on a negative film which is the photographic film 26.

In step 100, prescan image data of a film image which is the object to be processed is fetched. The prescan image data is data which expresses a density value for each of the component colors (R, G, B) for all of the pixels of the film image. In subsequent step 102, on the basis of the density value for each of the pixels of the film image which the fetched prescan image data expresses, the maximum density $Dj_{max}$ and the minimum density $Dj_{min}$ (j expresses either R, G, or B) are computed for each of the component colors.

In step 104, on the basis of the maximum density $Dj_{max}$ and the minimum density $Dj_{min}$ which have been determined from the prescan image data for each of the component colors, the maximum densities for the respective component colors ($Dr_{max}$, $Dg_{max}$, $Db_{max}$) are regarded as the densities of an assumed highlight point, and the minimum densities for the respective component colors ($Dr_{min}$, $Dg_{min}$, $Db_{min}$) are regarded as the densities of an assumed shadow point. For example, on a three-dimensional density coordinate system (RGB density coordinate system) shown in FIG. 3A, in which Dr for the R density, Dg for the G density, and Db for the B density are used as the coordinate axes, an axis (referred to as an "assumed gray axis" which serves as a first reference axis) which connects a density point corresponding to the assumed highlight point (i.e., a point at a position defined by the densities of the respective component colors of the assumed highlight point) and a density point corresponding to the assumed shadow point is set (see FIG. 3A).

Figure 3A:
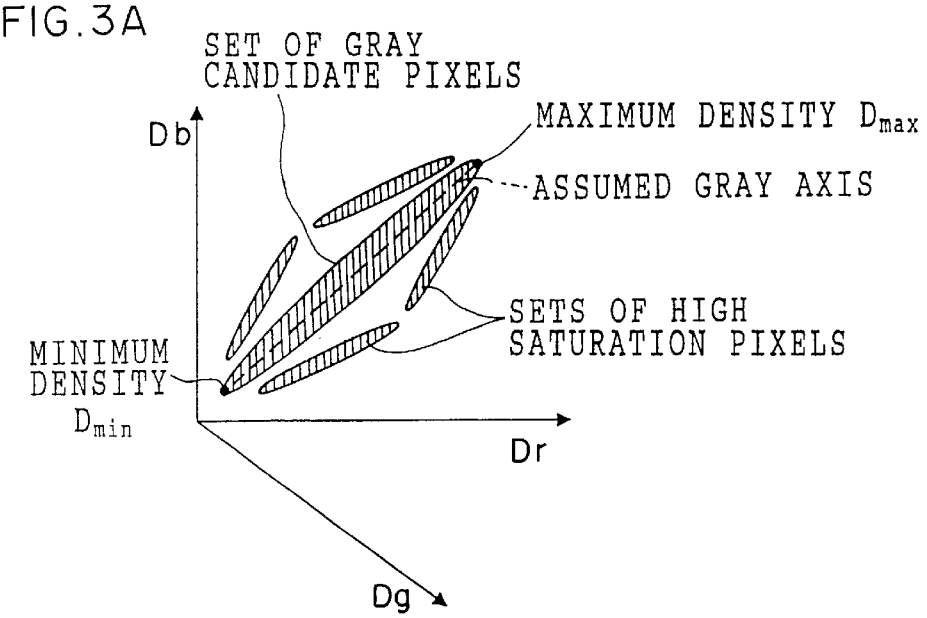
FIGS. 3A and 3B are conceptual views respectively showing an image having a large number of high saturation pixels.
Figure 3B:
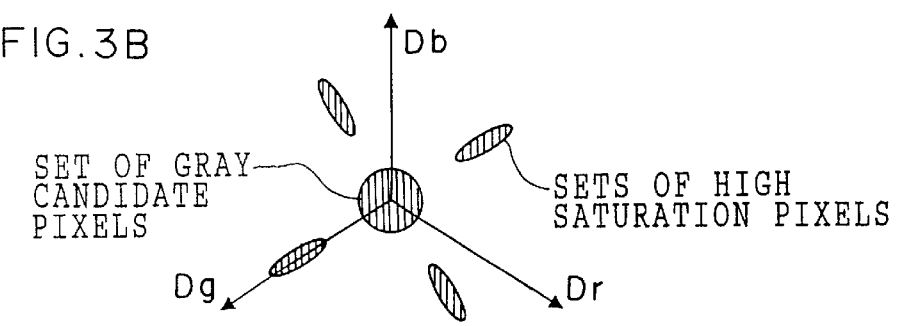

By conducting experiments, the present inventor has affirmed the following. In a case in which the film image is an image having a large number of high saturation pixels, for example (e.g., an image which is susceptible to color failure), as shown in FIGS. 3A and 3B as examples, the distribution of points obtained by plotting a point on the RGB density coordinate system at a position corresponding to a pixel, for each of the pixels of the film image (hereinafter, this distribution is simply referred to as the "distribution of the pixels on the RGB density coordinate system") turns out to be a distribution in which sets of high saturation pixels appear at positions somewhat removed from a periphery of a set of pixels which is assumed to express the gray balance ("sets of gray candidate pixels" in FIGS. 3A and 3B).

On the basis of the aforementioned, in step 106, in addition to determining the position of the corresponding point on the RGB density coordinate system for each of the pixels of the film image, the distance between the determined position and the aforementioned assumed gray axis (the geometric distance in a density space defined by the RGB density coordinate system) is computed, and a pixel whose corresponding point on the RGB density coordinate system has a position separated from the assumed gray axis by a predetermined distance or more is extracted as a high saturation pixel.

Extraction of high saturation pixels may be carried out as follows: the maximum density $Dj_{max}$ and the minimum density $Dj_{min}$ are computed for each of the component colors in the same way as in the prior step 102, and thereafter, a density value for each of the pixels of the film image is normalized for each of the component colors. This normalization can be carried out by using the following formula.

$$Dj'=100\times(Dj-Dj_{min})/(Dj_{max}-Dj_{min})$$

In the above formula, Dj is a density value for the component color j of a pixel which is the object to be processed, and Dj' is a normalized density value for the component color j.

Figure 4A:
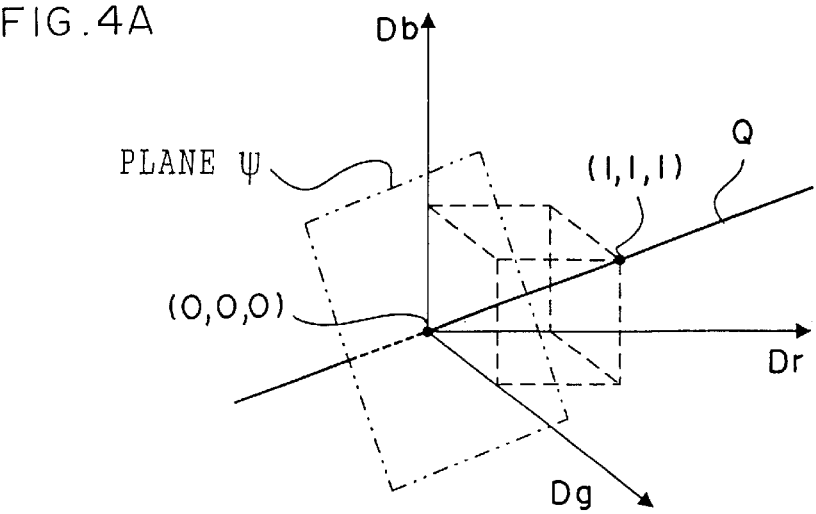
FIGS. 4A through 4C are conceptual views showing other examples of the high saturation pixel extraction method.

Next, saturation of each of the pixels is computed on the basis of the normalized density value for each of the component colors of each pixel of the film image. As shown in FIG. 4A as an example, a plane ψ (plane of R+G+B=0) which is perpendicular to a straight line Q, which passes through the origin of the RGB density space (0, 0, 0) and a point in the RGB density space (1, 1, 1) and includes the origin (0, 0, 0), is set. A density point of each of the pixels on the RGB density coordinate system, which corresponds to the normalized density value (Dr', Dg', Db') for each of the pixels, is mapped onto the plane ψ.

Figure 4B:
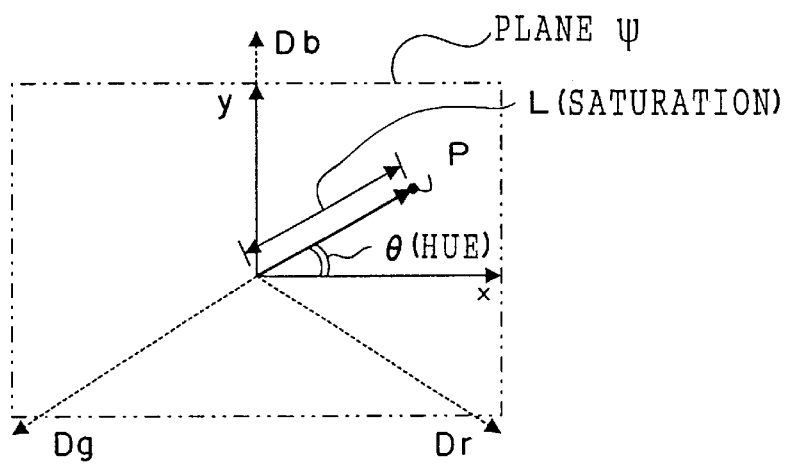

Subsequently, an X-Y orthogonal coordinate system shown in FIG. 4B is set on the plane ψ. Given that a mapping position on the plane ψ of the density point corresponding to the normalized density value for a certain pixel is a point P, hue of this pixel corresponds to the angle θ formed between the X axis and a straight line passing through the origin of the X-Y coordinate system and the point P, and saturation of the pixel corresponds to the distance between the origin of the X-Y coordinate system and the point P. For reference, brightness can be determined on the basis of the normalized densities of the respective pixels, by a computation formula such as the following: brightness=(Dr'+Dg'+Db')/3.

Figure 4C:
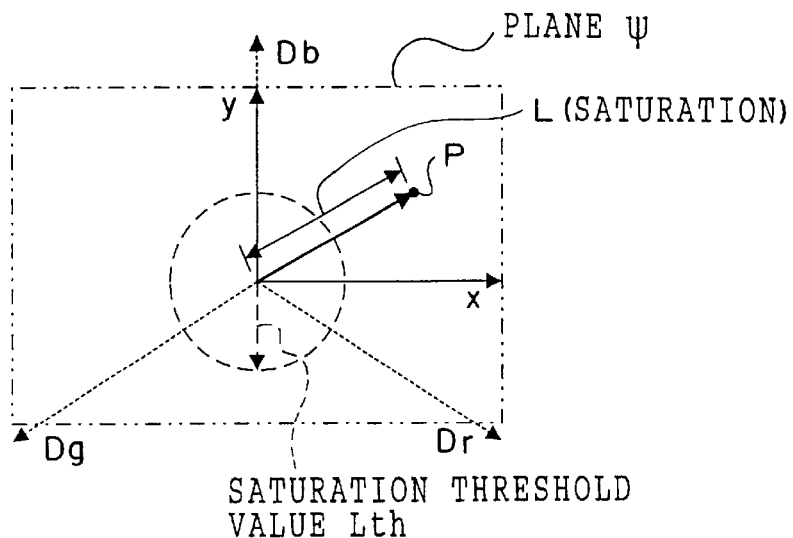

Accordingly, determination as to whether a pixel has high saturation can be made by determining a mapping position (position of the point P) on the plane ψ of the density point corresponding to the normalized density value for each of the pixels and, as shown in FIG. 4C, by comparing the distance between the origin of the X-Y coordinate system and the point P with a saturation threshold value Lth. A pixel in which the distance between the origin and the point P is greater than the saturation threshold value Lth can be extracted as a high saturation pixel.

In subsequent step 108, the hue of the particular high saturation pixel extracted in step 106 is compared with that of the respective eight pixels existing in the neighborhood of the particular high saturation pixel (so-called eight neighboring pixels) in the film image. If there is, among the eight pixels existing in the neighborhood of the particular high saturation pixel, a pixel whose hue approximates that of the particular high saturation pixel, this pixel is determined as a high saturation pixel. This determination is carried out for all of the high saturation pixels extracted in step 106.

In step 110, determination is made as to whether there is an increase in the number of the pixels which have been determined as high saturation pixels by the processing in step 108. If the answer to this determination is affirmative, the routine returns to step 108, and the hue of a pixel newly determined as a high saturation pixel is compared with the hue of the pixels existing in the neighborhood of this pixel (except for the pixels which have already been determined as high saturation pixels). Among the pixels existing in the neighborhood of the high saturation pixel, pixels whose hue approximates that of the high saturation pixel are determined as high saturation pixels. Step 108 is repeated until the answer to the determination in step 110 becomes negative. If the answer to the determination in step 110 becomes negative, the routine proceeds to step 112 where the pixels determined as high saturation pixels are excluded and only the pixels which have not been determined as high saturation pixels are recognized as gray candidate pixels. Further, data of the pixels which have been recognized as gray candidate pixels are stored.

By carrying out the aforementioned processings, even in cases in which a region which may cause color failure, i.e., a region including high saturation pixels and having a specific hue, are included in the film image, most of the pixels in the region can be excluded as high saturation pixels. As a result, pixels corresponding to gray portions of the object (pixels expressing the gray balance) make up a high proportion of the pixels recognized as the gray candidate pixels.

In subsequent step 114, density of a highlight point Dhj (maximum density) and density of a shadow point Dsj (minimum density) in the gray candidate pixels are respectively extracted for each of the component colors. Further, dynamic ranges for the respective component colors, i.e., IR=(Dhr−Dsr), IG=(Dhg−Dsg), and IB=(Dhb−Dsb), are determined, and differences between the dynamic ranges of the respective component colors, i.e., (IR-IG), (IG-IB), and (IB-IR), are computed. If the differences between the dynamic ranges exceed predetermined allowed values, any of the highlight densities (Dhr, Dhg, Dhb) can be corrected so that the dynamic ranges IR, IG, IB become equal to each other.

Figure 3C:
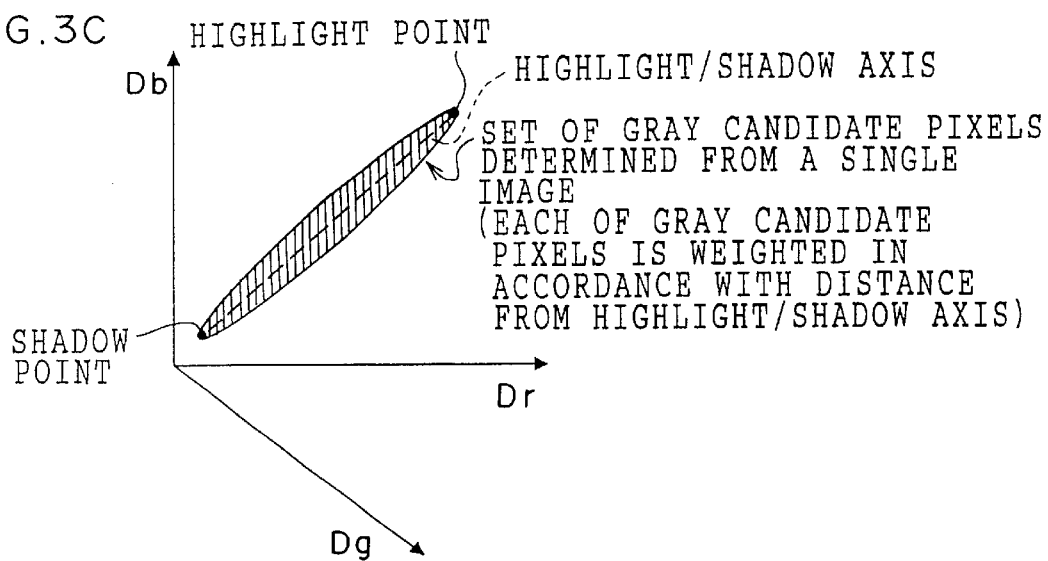
FIG. 3C is a conceptual view showing an example of the distribution, on an RGB density coordinate system, of data of each of the pixels after the high saturation pixels are excluded from the image.

In step 116, on the basis of the density of the highlight point Dhj and the density of the shadow point Dsj, which have been determined for each of the component colors from the gray candidate pixels, the density of the highlight point for each of the component colors (Dhr, Dhg, Dhb) is regarded as the density of the highlight point, while the density of the shadow point for each of the component colors (Dsr, Dsg, Dsb) is regarded as the density of the shadow point. An axis which connects the density point corresponding to the highlight point to the density point corresponding to the shadow point (called "highlight-shadow axis", which is a second reference axis) is set on the RGB density coordinate system (see FIG. 3C).

In order to realize bright color formation, in general, the photographic film has a photosensitive layer designed such that multicolor exposure forms an image having higher contrast than gray exposure, even when the exposure amount is the same (so-called interlayer effect). The maximum density of an image area corresponding to non-gray portions (e.g., red) of an object in a film image may be higher than that of an image area corresponding to gray portions of the object.

On the basis of the aforementioned, in the present embodiment, after an assumed gray axis has been set (step 104) on the basis of the maximum density $Dj_{max}$ and the minimum density $Dj_{min}$ determined in step 102 and high saturation pixels have been excluded (steps 106 through 112), a highlight-shadow axis (this is also a type of the assumed gray axis) is set again in step 116 on the basis of the density of the highlight point and the density of the shadow point. By correcting the aforementioned density of the highlight point or resetting the assumed gray axis, generation of color failure can be suppressed.

In subsequent step 118, the position of a corresponding point on the RGB density coordinate system is determined, for each of the gray candidate pixels. Further, the distances between the determined positions and the above highlight-shadow axis (geometric distance in the density space which corresponds to the difference in density between the pixels and the highlight-shadow axis) are computed. A weight is set for each of the gray candidate pixels such that, as the distance between the position of the point on the RGB density coordinate system (the respective points on the RGB density coordinate system corresponding to each of the pixels) and the highlight-shadow axis (density difference) increases, the weight decreases. In other words, the weight increases as the aforementioned distance (density difference) decreases. Subsequently, the weight which has been set in the aforementioned manner is stored.

In step 120, determination is made as to whether the above-described processings have been carried out for all of the film images recorded on the same photographic film 26. If the answer to this determination is negative, the routine returns to step 100, and the processings in steps 100 through 118 are repeated. In this way, gray candidate pixels are extracted from all of the film images recorded on the photographic film 26, and a weight is respectively set for all of the extracted gray candidate pixels. Steps 100 through 118 correspond to extracting means of the present invention.

If the answer to the determination in step 120 is affirmative, the routine proceeds to step 122. From step 122 on, on the basis of a group of the gray candidate pixels, which comprises the gray candidate pixels respectively extracted from the plurality of film images recorded on the same photographic film 26 (see FIG. 5A), a gray axis expressing the gray balance of the film image which is the object to be processed (i.e., one of the plurality of film images recorded on the same photographic film 26) is determined by linear approximation.

In other words, in step 122, a density area (the maximum density $Dj_{max}$ and the minimum density $Dj_{min}$ which have been computed in step 102) of the film image which is the object to be processed is fetched. In subsequent step 124, among the respective gray candidate pixels forming the group of the gray candidate pixels, there are extracted data of the gray candidate pixels corresponding to the density area (the range of density from the maximum density $Dj_{max}$ to the minimum density $Dj_{min}$), which has been fetched in the prior step 102, of the film image which is the object to be processed.

Figure 5A:
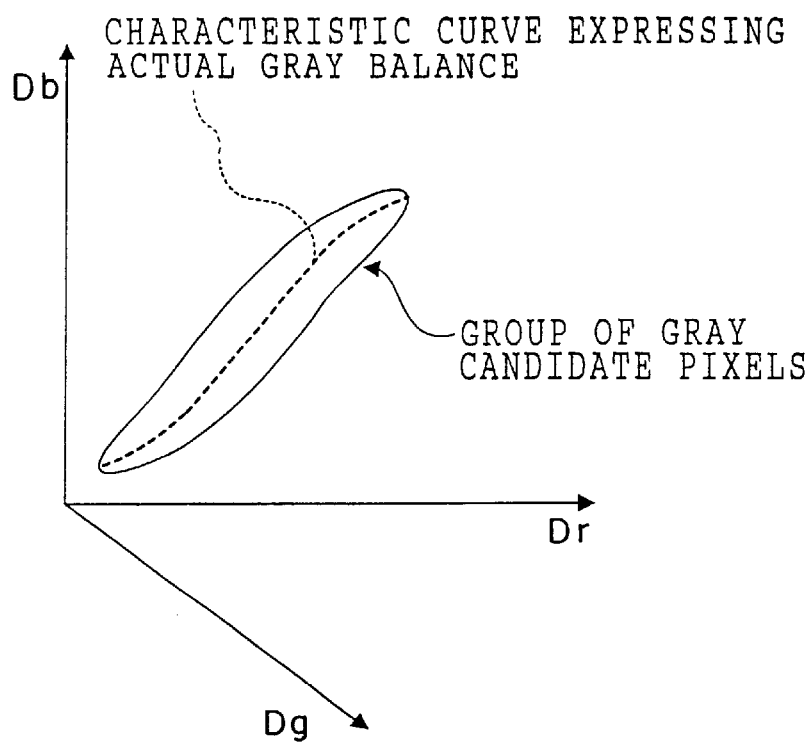
FIG. 5A is a conceptual view showing an example of the distribution, on the RGB density coordinate system, of a group of gray candidate pixels respectively extracted from a plurality of images.
Figure 5B:
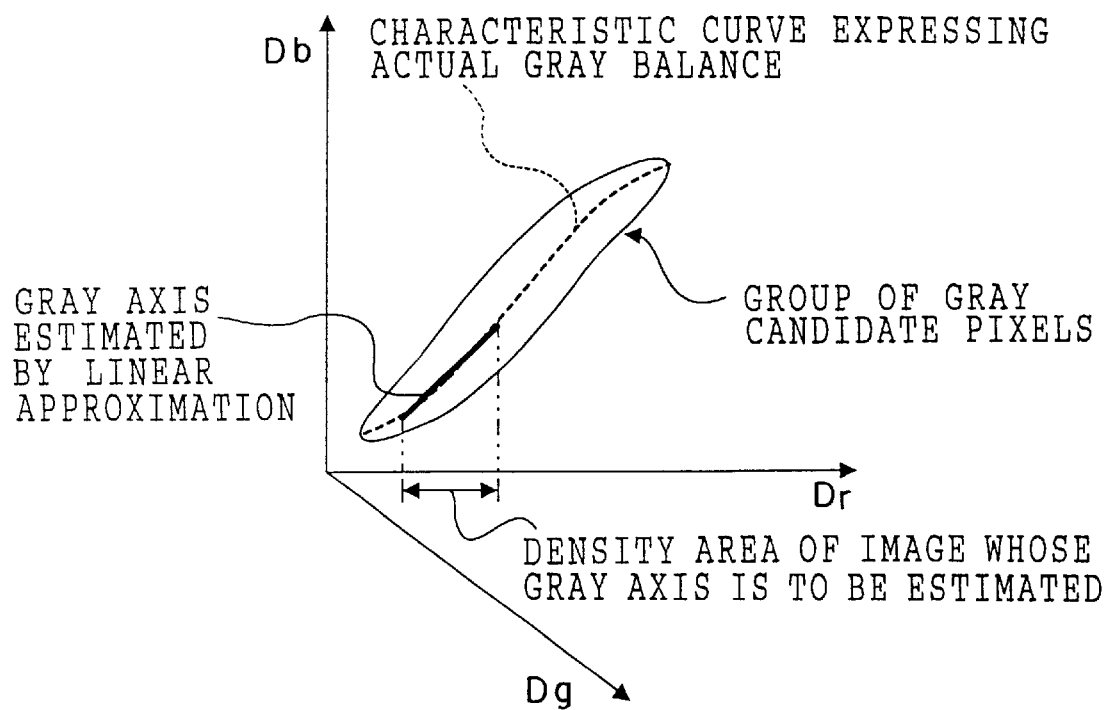
FIG. 5B is a conceptual view for explaining the estimation of the gray axis of a particular image from the group of the gray candidate pixels in FIG. 5A.

Since the density area for each of the plurality of film images recorded on the photographic film is changeable, the distribution on the RGB density coordinate system of the gray candidate pixel group comprising the gray candidate pixels has a scope corresponding to the color formation density area of the photographic film 26 (generally a density value range of approximately 3.0). On the other hand, the density area of each of the film images recorded on the photographic film has a density value range of approximately 1.0. Accordingly, as FIG. 5A shows an example of "the density area of the image which is the estimated object of the gray axis", in step 124, data of only the gray candidate pixels of the gray candidate pixel group within a part of the density area are extracted from the gray candidate pixels within the entire density area.

In subsequent step 126, data which has been extracted in step 124 and expresses weights of the gray candidate pixels is fetched. In step 128, among the permitted limit of the gradient of the gray axis which has been set in advance so as to correspond to the number of the film images recorded on the photographic film, the permitted limit of the gradient of the gray axis which corresponds to the number of the film images recorded on the photographic film 26, which is the object to be processed, is fetched. The permitted limit of the gradient of the gray axis is set so as to become smaller as the number of the film images decreases.

Further, in step 130, on the basis of the weights of the gray candidate pixels which have been extracted in step 124 and the weights of the respective gray candidate pixels which have been extracted in step 126, distribution of the extracted gray candidate pixels on the RGB density coordinate system is subjected to linear approximation while the weight applied to each of the gray candidate pixels is also taken in account, and the gray axis of the film image which is the object to be processed is estimated and computed such that the gradient of the gray axis is within the permitted limit which has been fetched in step 128.

For linear approximation, for example, a method such as the method of least squares which is used for linear multiple regression analysis and the like can be used in such a manner that the sum of squares of prediction errors is minimized. In this case, if computation is carried out by, for example, the method of least squares, making the gradient of the gray axis within the permitted limit can be realized by adding, to a simultaneous equation, a conditional expression in which, among variables defining the gray axis, the variables defining the gradients of the gray axis are limited to the values within a range of numerical values which corresponds to the aforementioned permitted limit.

Further, linear approximation which reflects the weights of the respective gray candidate pixels can be realized by converting data of the gray candidate pixels in such a manner that, for pixels having large weights, for example, the number of the gray candidate pixels existing at a position substantially the same as that in the RGB density space increases on the data (e.g., data of one pixel is converted into data of 100 pixels, or the like). Further, the data of the gray candidate pixels is converted such that, for pixels having small weights, the number of the gray candidate pixels existing at a position substantially the same as that in the RGB density space decreases on the data (e.g., data of 100 pixels is converted into data of one pixel, or the like). Linear approximation is then carried out using the converted data of the gray candidate pixels.

Furthermore, linear approximation may be carried out on the three-dimensional space (the RGB density space) or on a plurality of the two-dimensional spaces (e.g., respective density spaces of R-G, G-B, B-R). For example, estimation of the gray axis by linear approximation on the RGB density space can be carried out by using a density area for a particular component color of the film image serving as the density area of the film image which is the object to be processed, or by using a density area for R, G, B average densities of the film image, and by conducting linear approximation of the distribution of the gray candidate pixels on the RGB density space which exist in the density area.

Moreover, estimation of the gray axis by linear approximation on the respective density spaces of R-G, G-B, B-R can be carried out in the following manner, for example. For the R-G density space, the distribution of the gray candidate pixels existing in the density area of R of the film image is subjected to linear approximation. For the G-B density space, the distribution of the gray candidate pixels existing in the density area of G of the film image is subjected to linear approximation. For the B-R density space, the distribution of the gray candidate pixels existing in the density area of G of the film image is subjected to linear approximation. Then, the axis corresponding to the center of gravity of the three axes which have been obtained by linear approximation on the respective spaces is computed, as the gray axis.

Step 130 corresponds to the estimating means relating to the present invention (more particularly, estimating means in the aforementioned second aspect), and steps 128 and 130 correspond to the estimating means in the third and fourth aspects, respectively.

In subsequent step 132, on the basis of the results of estimation and computation of the gray axis of the film image which is the object to be processed, processing conditions for the density and color conversion processing for fine scan image data (a concrete example of the conditions for density and color conversion is conversion data set in a LUT (look up table) for carrying out the density and color conversion processing) are respectively set such that gray portions of the object at the time of photographing are reproduced as gray in the output image.

For example, among the gray balance which is expressed by the estimated and computed gray axis, if the relationship between the G density Dg and the R density Dr (corresponding to the results of projection of the gray axis on a two-dimensional density coordinate system whose coordinate axes are the G density and the R density) is expressed by $Dg=\alpha rg \cdot Dr + \beta rg$ and the relationship between the G density Dg and the B density Db (corresponding to the results of projection of the gray axis on a two-dimensional density coordinate system whose coordinate axes are the G density and the B density) is expressed by $Dg=\alpha bg \cdot Db + \beta bg$, the above-described conditions for density and color conversion are set such that, for example, the G density Dg is not converted, the R density Dr is converted in accordance with a conversion equation $Dg=\alpha rg \cdot Dr + \beta rg$, and the B density is converted in accordance with a conversion equation $Db=\alpha bg \cdot Db + \beta bg$.

In next step 134, determination is made as to whether the aforementioned processings (i.e., estimation and computation of the gray axis, and setting of the processing conditions of the density and color conversion processing) have been carried out for all of the film images recorded on the same photographic film 26. If the answer to this determination is negative, the routine goes back to step 122 and repeats the processings in steps 122 through 132 for all of the film images. In this way, with each of the film images being regarded as a unit, the gray axis expressing the gray balance is respectively estimated and computed for all of the film images recorded on the same photographic film 26.

There are limits to the accuracy of extraction of the gray candidate pixels in steps 100 through 112 described above. For example, in a case in which the film image which is the object to be processed is susceptible to color failure or highlight failure, pixels which are appropriate as gray candidate pixels (pixels expressing the gray balance) may not be extracted.

With regard to this matter, in the present embodiment, gray candidate pixels are respectively extracted from the plurality of film images recorded on the same photographic film 26, and the group of gray candidate pixels comprising the gray candidate pixels respectively extracted from the plurality of film images are used at the time of estimating the gray balance. Since the group of gray candidate pixels comprises the gray candidate pixels respectively extracted from the plurality of film images, variation in the image contents of the plurality of film images is equalized with the entire group of gray candidate pixels. Even in a case where pixels which are appropriate as gray candidate pixels have not been extracted from a particular film image, the effect caused by no appropriate pixels having been extracted is alleviated.

Therefore, the distribution of the group of gray candidate pixels on the RGB density coordinate system expresses with high accuracy on the whole the gray balance over the entire area of the color forming density area of the photographic film 26 (the gray balance on each of the film images recorded on the photographic film 26). By estimating the gray balance using the group of gray candidate pixels, the gray balance on each of the film images recorded on the same photographic film can be estimated with high accuracy. Further, there can be obtained appropriate conditions for density and color conversion by which image data can be converted in such a manner that gray portions of the object at the time of photographing are reproduced as gray.

Further, film characteristics and the like are reflected in the gray balance over the entire area of the color forming density area of the photographic film 26, which gray balance is expressed by the distribution of the group of gray candidate pixels on the RGB density coordinate system. As shown in FIG. 5A by a dashed line, the gray balance is expressed as a curve on the RGB density coordinate system (see "characteristic curve expressing the actual gray balance" shown in FIG. 5A by a dashed line).

On the contrary, in the present embodiment, the gray balance is estimated and computed by carrying out linear approximation within the density area of the respective film images (within the density area which is substantially narrower than the color forming density area of the photographic film 26) with each of the film images being regarded as a unit. Accordingly, in comparison with the case in which a characteristic curve expressing the gray balance is determined by a non-linear approximation of higher order, processings are made considerably easier, and the gray balance can be estimated for each of the film images with a sufficiently high and stable estimated accuracy.

If the answer to the determination in step 134 is affirmative, the routine proceeds to step 136 where the processing conditions for the density and color conversion processing which have been set for each of the film images are outputted to the image processor 40 which carries out the density and color conversion processing for the fine scan image data. The processing for setting the density and color conversion conditions is thereby completed.

When the fine scan image data are inputted to the image processor 40 of the image processing section 14 by fine scanning being carried out in the film scanner 12 for each of the film images recorded on the photographic film 26, the image processor 40 reads the density and color conversion conditions corresponding to the inputted fine scan image data. The image processor 40 then carries out the density and color conversion processing in accordance with the read density and color conversion conditions.

In this way, even if an film image which is susceptible to color failure or highlight failure is included among the plurality of film images recorded on the photographic film 26, output image data which reproduce gray portions of the object at the time of photographing as gray are respectively obtained from fine scan image data of the respective film images.

In the aforementioned, for each of the film images, reading has been carried out twice (i.e., a reading at a relatively low resolution (prescanning) and a reading at a relatively high resolution (fine scan)), and setting of the density and color conversion conditions has been carried out by using the low-resolution image data obtained by prescanning. However, reading of the film images is not limited as such. For example, the image data obtained by prescanning may be used only at the time of determining the reading conditions for fine scanning. Alternatively, only a single reading may be carried out for the film image at a resolution corresponding to that of fine scan. In the latter case, setting of the density and color conversion conditions can be carried out by generating low-resolution image data by conducting processings such as thinning or integration of pixels for high-resolution image data obtained by fine scan, and by using the generated low-resolution image data.

Further, in the aforementioned, at the time of estimating and computing the gray axis of the film image which is the object to be processed, tolerance of the gradient of the gray axis is set to be smaller as the number of the film images recorded on the photographic film 26 which is the object to be processed decreases. However, the present invention is not limited as such. At the time of setting the tolerance of the gradient of the gray axis, other than using the number of the film images, either one or combinations of the following can be used: the total number of the gray candidate pixels which have been extracted from a plurality of film images recorded on the photographic film 26 which is the object to be processed; instructions from the operator; the film type of the photographic film 26 which is the object to be processed; and the exposure level at which the film image which is the object to be processed has been recorded by exposing the photographic film 26 which is the object to be processed.

For example, in a case where tolerance of the gradient of the gray axis is set in accordance with the total number of the gray candidate pixels extracted from a plurality of film images, as an example, the tolerance of the gradient of the gray axis is made narrower as the total number of the extracted gray candidate pixels decreases. More specifically, this can be realized by using a map which determines the relation between the total number of the gray candidate pixels and the amount of change in the tolerance of the gradient of the gray axis such that, for example, the tolerance of the gradient is made narrower as the total number of the gray candidate pixels decreases. The tolerance of the gradient of the gray axis is changed according to the map, in accordance with the total number of the gray candidate pixels. Setting of the tolerance of the gradient of the gray axis in accordance with the total number of the gray candidate pixels corresponds to the fifth aspect of the present invention.

In this way, even when a majority of the film images recorded on the photographic film 26 which is the object to be processed is susceptible to color failure and the total number of the extracted gray candidate pixels is small, by estimating and computing the gray axis in such a manner that variation of the gradient of the gray axis is restricted, the gray balance on each of the film images can be estimated with an accuracy of a predetermined value or more. Further, appropriate density and color conversion conditions can be obtained, by which image data can be converted so that gray portions of the object at the time of photographing are reproduced as gray.

Moreover, for example, setting of the tolerance of the gradient of the gray axis in accordance with instructions from the operator can be realized by, specifically, for example, the operator operating the keyboard or the mouse (corresponding to the designating means described in the sixth aspect), designating the entire tolerance of the gradient of the gray axis or the amount of change for the tolerance, and resetting the tolerance in accordance with instructions from the operator or changing the tolerance by the amount of change which has been specified. Changing the tolerance of the gradient of the gray axis in accordance with instructions from the operator corresponds to the sixth aspect of the present invention.

In this way, for example, in a case in which the operator desires to obtain an output image having an image quality similar to that obtained in the surface exposure method, if the operator specifies the tolerance such that the tolerance of the gradient of the gray axis is narrow, the gray axis is estimated and computed so that variation of the gradient of the gray axis is restricted, and appropriate density and color conversion conditions can be obtained by which image data can be converted so that an output image having desired image quality can be obtained. Further, for example, in a case in which the operator examines the photographic film 26 which is the object to be processed and determines that the original images recorded on the photographic film 26 have undergone color fading due to time-induced deterioration, if the operator specifies the tolerance so that the tolerance of the gradient of the gray axis is wide, the gray axis is estimated and computed by subjecting the distribution of the gray candidate pixels on the RGB density coordinate system to linear approximation in a relatively faithful manner. Accordingly, regardless of deviation of the gray balance caused by time-induced deterioration or the like, appropriate density and color conversion conditions can be obtained.

Specifically, setting of the tolerance of the gradient of the gray axis in accordance with, for example, the film type of the photographic film 26 which is the object to be processed can be realized by detecting the film type of the photographic film 26 which is the object to be processed by, for example, reading a DX code recorded thereon or the like, and by changing the tolerance of the gray axis so that the tolerance of the gradient of the gray axis is wide, in a case in which the film type of the photographic film 26 which is the object to be processed is specific and greatly different from other film types of photographic films in the exposure amount-color formation density characteristics, for example. Setting of the tolerance of the gradient of the gray axis in accordance with the film type corresponds to the seventh aspect of the present invention.

In this way, for example, even when the exposure amount-color formation density characteristics of the photographic film 26 which is the object to be processed are greatly different from those of other film types of photographic films, by the tolerance of the gradient of the gray axis being made wide, the distribution of the gray candidate pixels on the RGB density coordinate system is subjected to linear approximation in a relatively faithful manner, and the gray axis is estimated and computed. Therefore, appropriate density and color conversion conditions can be obtained regardless of the characteristics of the photographic film 26 which is the object to be processed.

Specifically, setting of the tolerance of the gradient of the gray axis in accordance with the exposure level at which the film image which is the object to be processed has been recorded by exposing the photographic film 26 which is the object to be processed can be carried out in the following manner, for example.

First, the exposure level at which the film image which is the object to be processed has been recorded by exposing the photographic film 26 is detected. For example, when the photographic film 26 which is the object to be processed is an APS film, and information expressing the exposure level at the time of exposure and recording of the image is magnetically recorded onto a magnetic track of the APS film, detection of the exposure level can be carried out by reading from the magnetic track the information expressing the exposure level. Alternatively, the exposure level may be estimated on the basis of, for example, density difference between the film-based density of the photographic film 26 which is the object to be processed and the density of the film image which is the object to be processed (e.g., average density of the image).

Subsequently, when the film image which is the object to be processed has an exposure level which falls within the normal exposure region, the tolerance of the gradient of the gray axis is changed so that the tolerance of the gradient of the gray axis is made narrow. When the film image which is the object to be processed has an exposure level which falls within the underexposure region or the overexposure region, the tolerance of the gradient of the gray axis is changed so that the tolerance of the gradient of the gray axis is made wide. Setting of the tolerance of the gradient of the gray axis in accordance with the exposure level of the film image, as described above, corresponds to the eighth aspect of the present invention.

In this way, the gray axis can be estimated and computed under appropriate estimation conditions for each of the exposure regions (density regions). Therefore, appropriate density and color conversion conditions can be obtained regardless of the exposure level at which the film image which is the object to be processed has been recorded by exposing the photographic film 26 which is the object to be processed. (The density region of the film image which is the object to be processed changes in accordance with this exposure level.)

EXAMPLES

Next, a description will be given of the results of experiments conducted by the present inventor. The present inventor used film images recorded on an actual photographic film and conducted experiments of comparison, in estimated accuracy of a gray axis. The following were compared: a case in which a gray axis was estimated by extracting gray candidate pixels from a single film image, and a case in which gray candidate pixels were extracted from a plurality of film images and a gray axis was estimated for each of the images.

Figure 6:
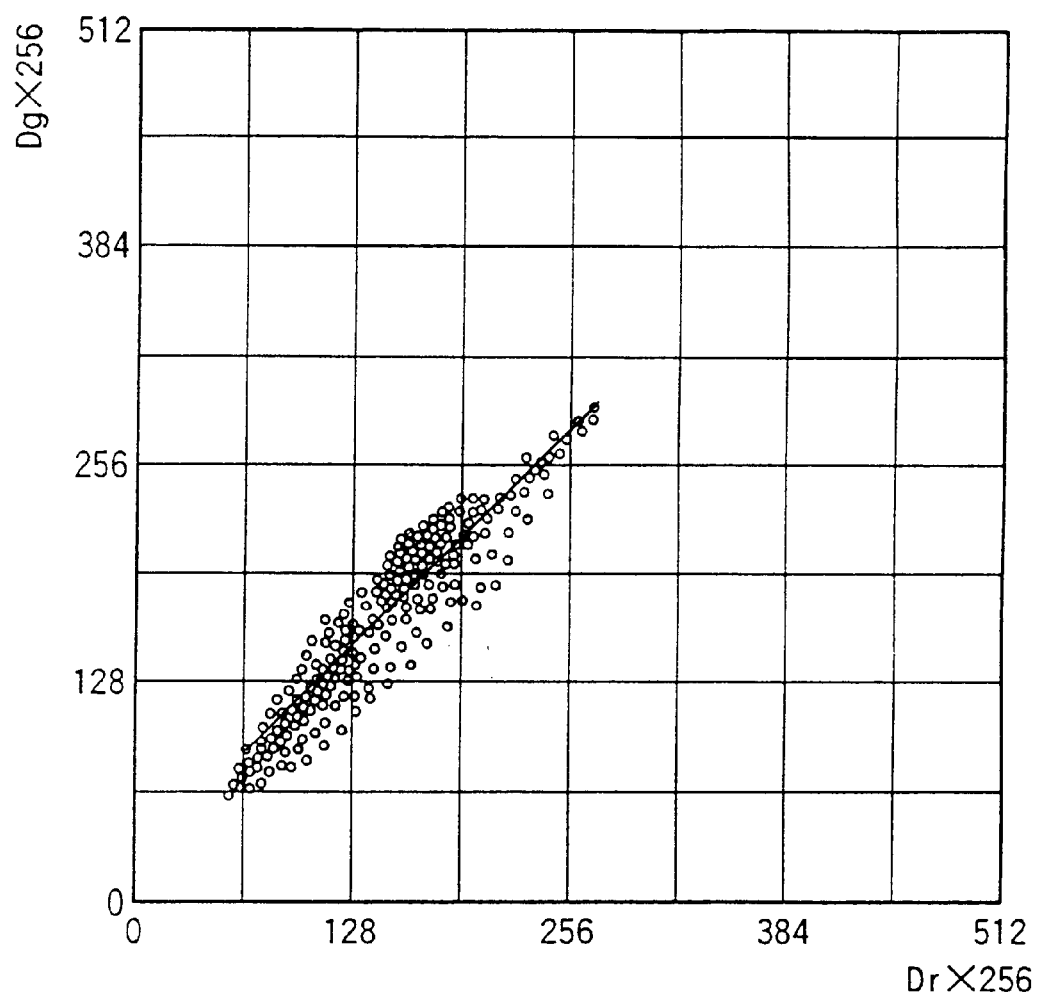
FIG. 6 is a graph showing the results of a first experiment carried out by the present inventor.
Figure 7:
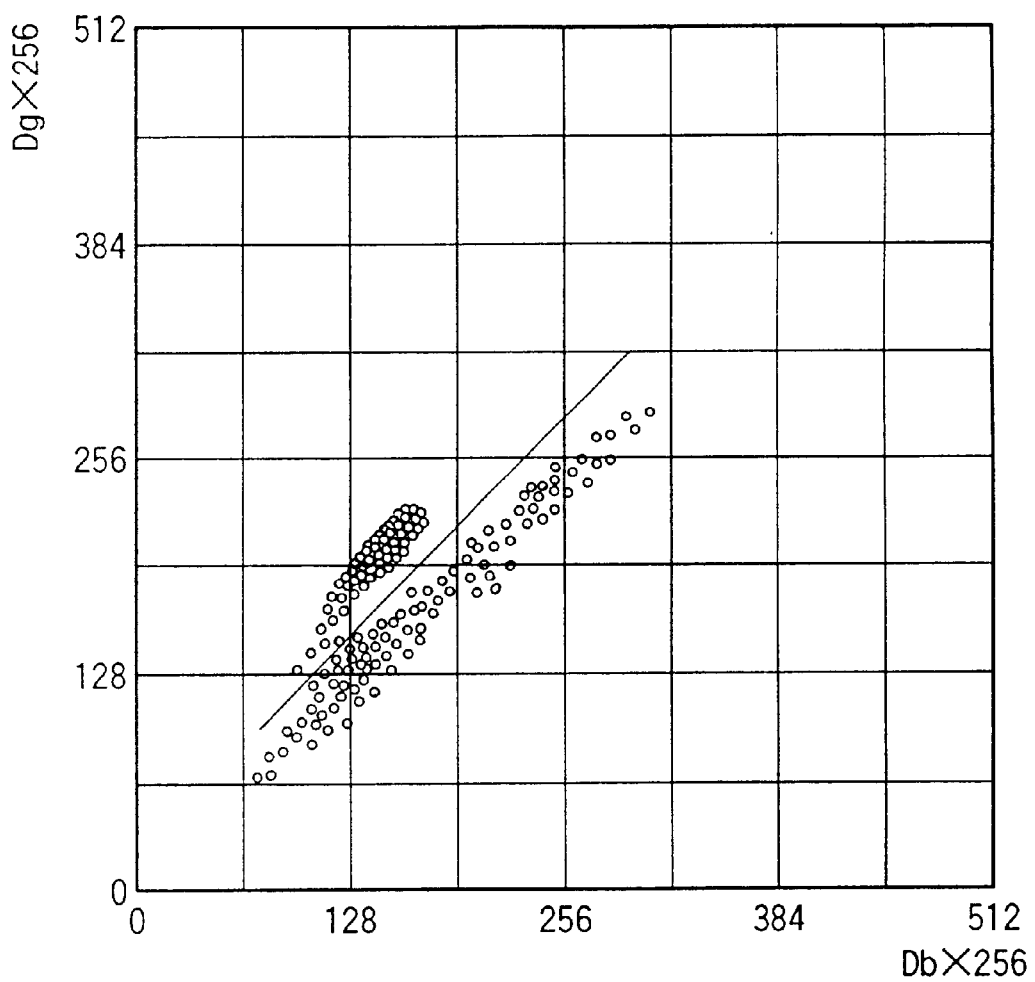
FIG. 7 is a graph showing the results of the first experiment carried out by the present inventor.

FIGS. 6 and 7 respectively show the results of the following processings: a first film image, which is the object to be processed and has a wide area occupied by an area corresponding to green turf as an example (i.e., a film image susceptible to color failure), was subjected to processings corresponding to steps 100 through 112 in FIG. 2 so that gray candidate pixels were extracted. Thereby, a gray axis expressing the gray balance was estimated. The distribution of the extracted gray candidate pixels and the gray axis are shown on a RG density coordinate system (a two-dimensional coordinate system whose coordinate axes are the R density and the G density) in FIG. 6 and on a BG density coordinate system (a two-dimensional coordinate system whose coordinate axes are the B density and the G density) in FIG. 7.

Figure 8:
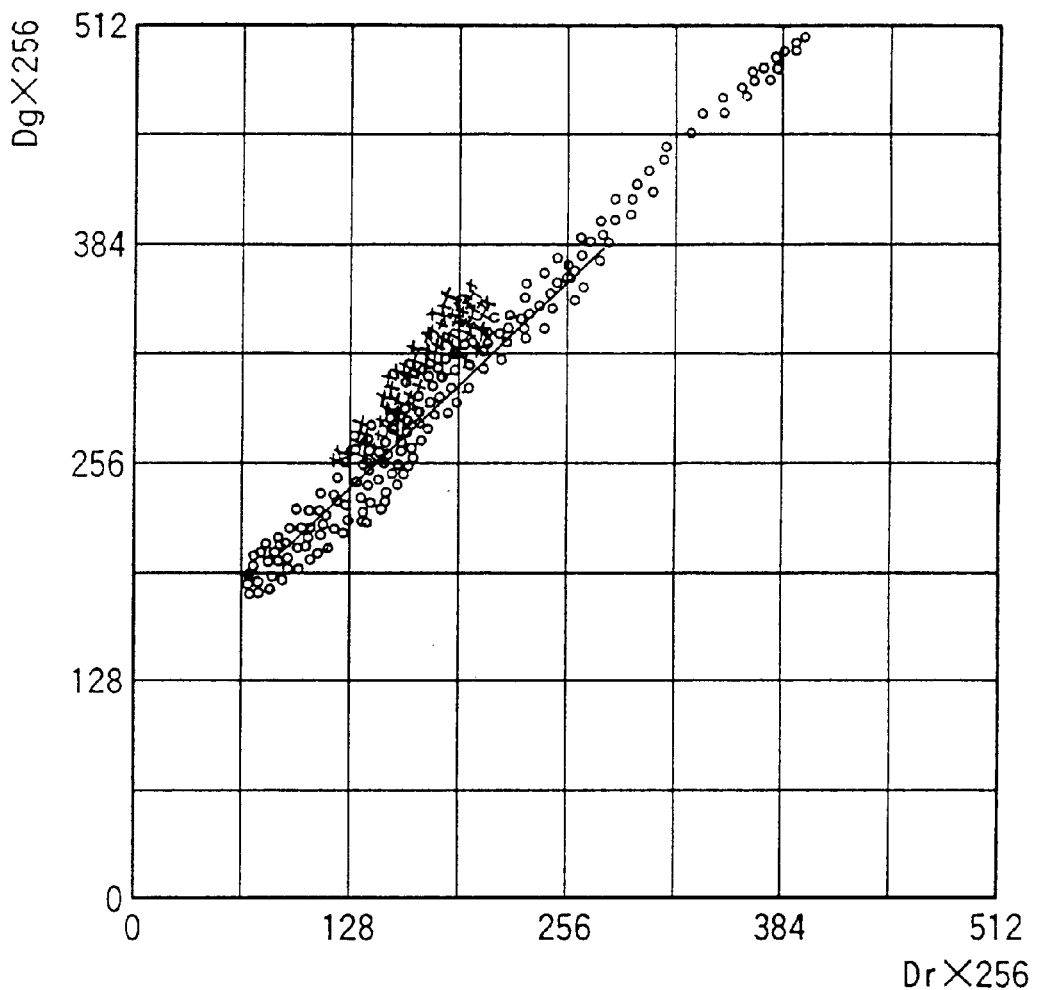
FIG. 8 is a graph showing the results of a second experiment carried out by the present inventor.
Figure 9:
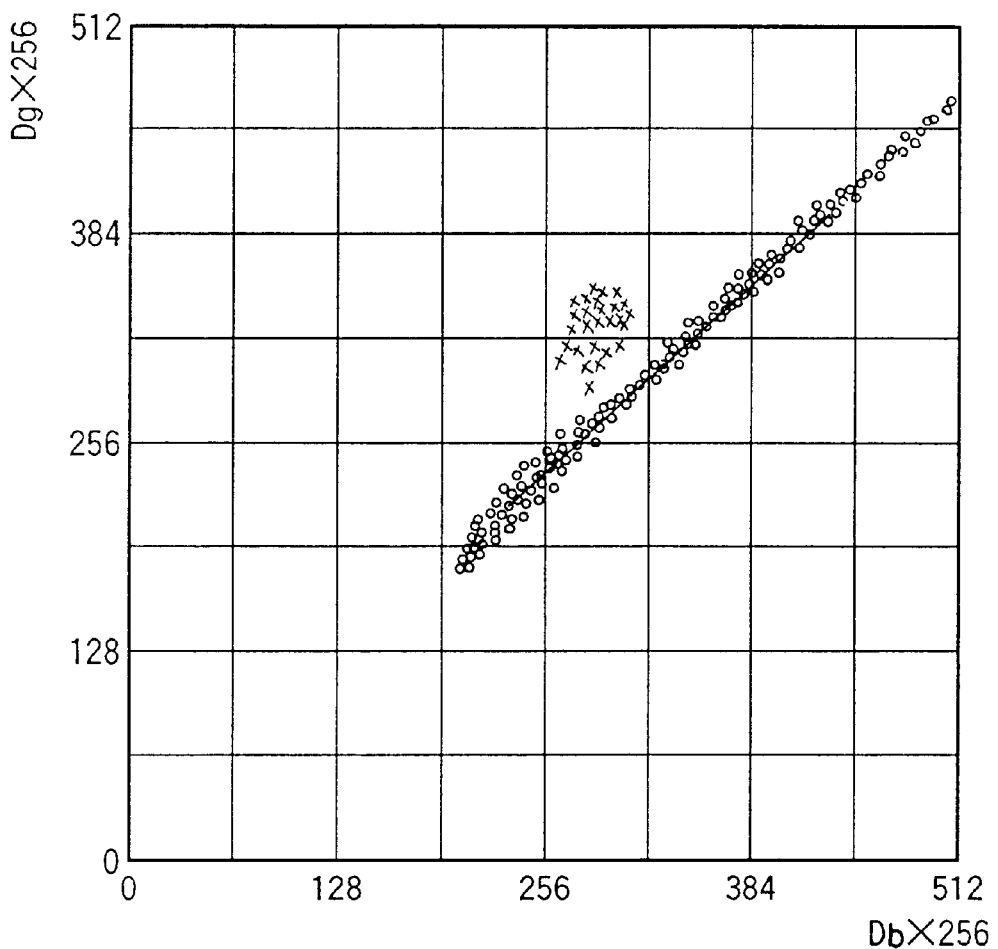
FIG. 9 is a graph showing the results of the second experiment carried out by the present inventor.

On the other hand, FIGS. 8 and 9 show the results of the following processings: gray candidate pixels were respectively extracted from film images in 24 frames including the aforementioned first film image and recorded on the same photographic film, and a gray axis was estimated for each of the film images in the frames for a group of the gray candidate pixels comprising the gray candidate pixels respectively extracted from each of the film images (i.e., the processings corresponding to steps 100 through 134 in FIG. 2 were carried out). The distribution of the gray candidate pixels and the gray axis determined for the first film image are shown on a RG density coordinate system in FIG. 8, and a BG density coordinate system in FIG. 9.

In the example in which the processings were carried out for the first film image which was the object, as is clear from FIGS. 6 and 7, a portion of the group of pixels corresponding to the green turf remains as high saturation pixels (the group of pixels located at a somewhat upper side on the density coordinate system), and this portion of the group of pixels adversely affects the estimation and computation of the gray axis (particularly notable in FIG. 7). The present inventor recognizes that, if the density and color conversion processing is carried out for the first film image with the gray axis being the reference, the image expressed by image data after the density and color conversion processing would have a dim green turf portion.

On the other hand, in the example in which the film images in 24 frames are the object to be processed, as is clear from FIGS. 8 and 9, the proportion of groups of pixels occupied among groups of the gray candidate pixels and expressing the appropriate gray balance (groups of pixels extending from the lower left to the upper right of the density coordinate system) is increased (in FIGS. 8 and 9, the gray candidate pixels extracted from the first film image is indicated by "x") Therefore, the gray axis expressing the gray balance can be estimated with high accuracy. Further, it is also confirmed by the present inventor that, if the gray axis of the first film image (straight lines in FIGS. 8 and 9) is estimated from the group of gray candidate pixels shown in FIGS. 8 and 9, and the density and color conversion processing of the first film image is carried out with the estimated gray axis being used as the reference, the image expressed by the image data after the density and color conversion processing has a preferable image quality (the green turf portion is reproduced so as to be bright).

Figure 10:
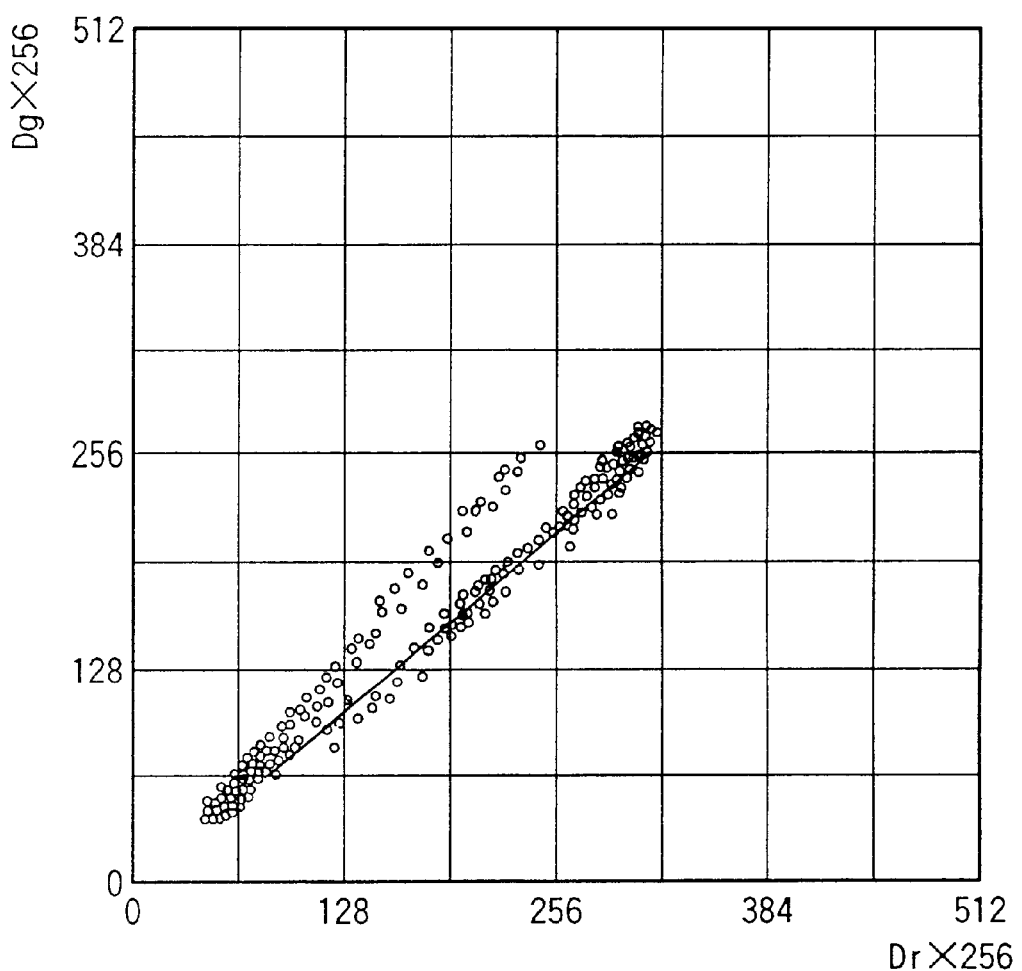
FIG. 10 is a graph showing the results of a third experiment carried out by the present inventor.
Figure 11:
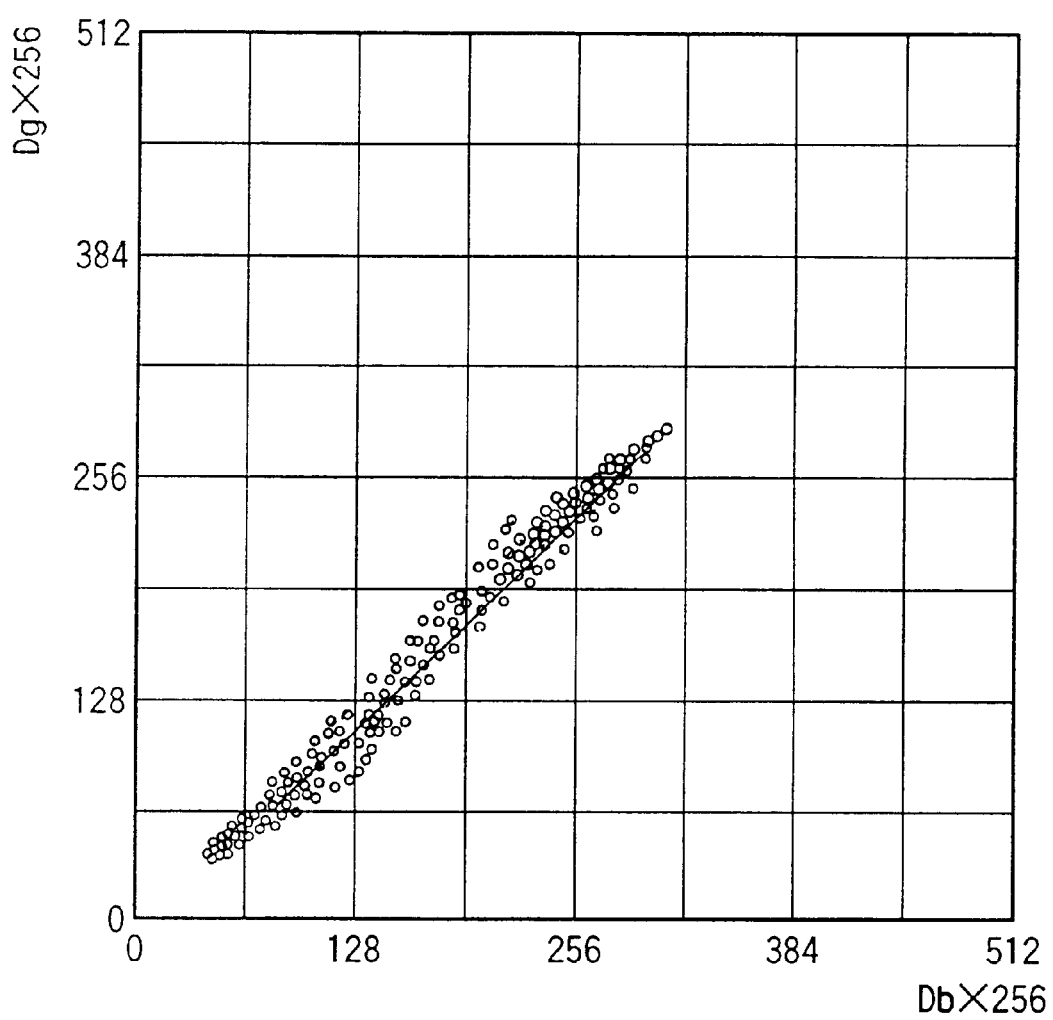
FIG. 11 is a graph showing the results of the third experiment carried out by the present inventor.

Furthermore, FIGS. 10 and 11 show the results of the following processings. A second film image (film image susceptible to highlight failure), whose highlight point (a portion onto which flash light is strongly reflected among regions corresponding to a face of a person) takes a flesh-colored hue and which is formed by photographing, with a flash, a scene including a face of a person as an example, is regarded as the object. Gray candidate pixels are extracted from this second film image, and a gray axis expressing the gray balance is estimated. The distribution of the extracted gray candidate pixels and the estimated gray axis determined for the second film image are shown on a RG density coordinate system in FIG. 10 and on a BG density coordinate system in FIG. 11.

Figure 12:
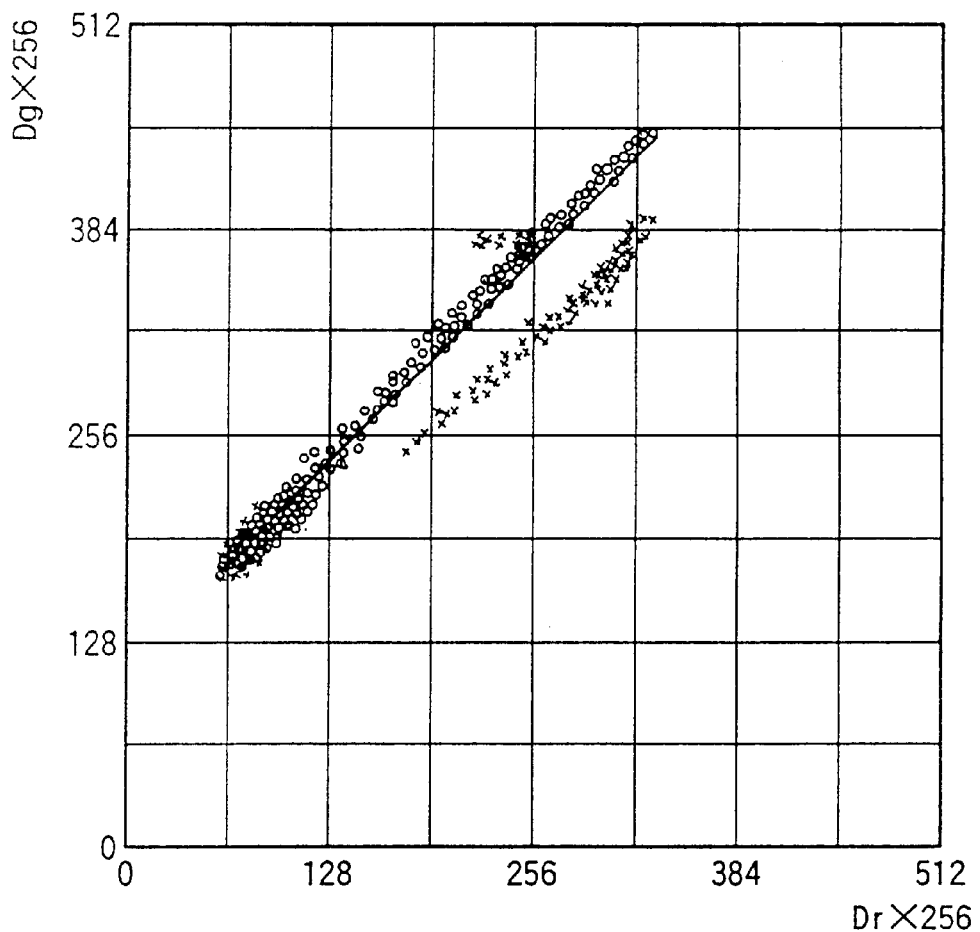
FIG. 12 is a graph showing the results of a fourth experiment carried out by the present inventor.
Figure 13:
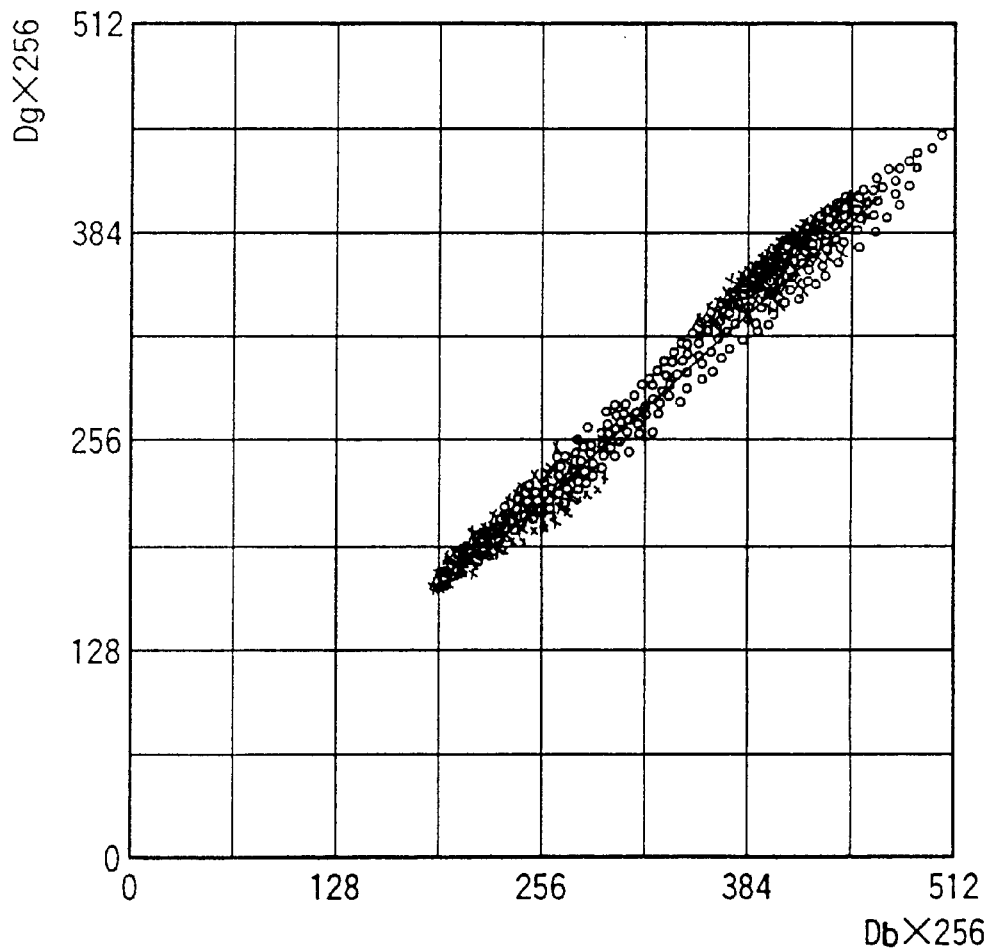
FIG. 13 is a graph showing the results of the fourth experiment carried out by the present inventor.

On the other hand, FIGS. 12 and 13 show the results of the following processings. Gray candidate pixels were respectively extracted from film images in 24 frames including the second film image and recorded on the same photographic film. A gray axis was estimated for each of the film images in the frames for a group of the gray candidate pixels comprising the gray candidate pixels respectively extracted from each of the film images. The distribution of the gray candidate pixels and the gray axis determined for the first film image are shown on a RG density coordinate system in FIG. 12 and a BG density coordinate system in FIG. 13.

In the example in which the processings were carried out with only the second film image being the object, the estimation and computation of the gray axis are adversely affected by the highlight point being flesh-colored. The gray axes shown in FIGS. 10 and 11 deviate from the actual gray balance. Therefore, if the density and color conversion processing is carried out for the second film image with the aforementioned gray axis being the reference, since color tint of the highlight point is estimated to be gray (white) when the density and color conversion processing is carried out, the image expressed by the image data after the processing is whitish over the entire image including the highlight point.

On the other hand, in the example in which the film images in 24 frames are the object to be processed, as is clear from FIGS. 12 and 13 (in FIGS. 12 and 13, the gray candidate pixels extracted from the second film image are indicated by "x"), the proportion of groups of pixels occupied among groups of the gray candidate pixels and expressing the appropriate gray balance (particularly in FIG. 12, of two groups of pixels extending from the lower left to the upper right of the density coordinate system, the group of pixels located towards the top) is increased, and therefore, the gray axis expressing the gray balance can be estimated with high accuracy. Further, it is also confirmed by the present inventor that, if the gray axis of the second film image (straight lines in FIGS. 12 and 13) is estimated from the group of gray candidate pixels shown in FIGS. 12 and 13, and the density and color processing of the second film image is carried out with the estimated gray axis being used as the reference, the image expressed by the image data after the density and color conversion processing has preferable image quality (the region corresponding to a person's face and including the highlight portion is reproduced so as to be brightly flesh-colored).

What is claimed is:

1. An image processing device, comprising:

extracting means which, on the basis of image data expressing a single original image recorded on a photographic film, determines an image characteristic value of the original image and, on the basis of the determined image characteristic value, extracts from the image data gray candidate pixels which have a high possibility of being pixels corresponding to gray portions of an object, said determination and extraction being carried out for each of a plurality of original images recorded on the photographic film; and estimating means for estimating gray balance on the basis of distribution of a group of gray candidate pixels on a predetermined coordinate system which group comprises the gray candidate pixels respectively extracted from the plurality of original images by said extracting means.

2. An image processing device according to claim 1, wherein, for each of the plurality of original images, by subjecting, among the distribution of the group of gray candidate pixels on the predetermined coordinate system, a distribution in a density area of an original image, which is an object of estimation, to linear approximation, said estimating means estimates a gray axis expressing the gray balance in the original image.

3. An image processing device according to claim 2, wherein said estimating means carries out the linear approximation in such a manner that gradient of the gray axis is within a predetermined range.

4. An image processing device according to claim 3, wherein said estimating means changes the restriction on the gradient of the gray axis in accordance with the number of the original images recorded on the photographic film.

5. An image processing device according to claim 3, wherein said estimating means changes the restriction on the gradient of the gray axis in accordance with the number of the gray candidate pixels extracted from the image data.

6. An image processing device according to claim 3, further comprising designating means for designating the restriction on the gradient of the gray axis, wherein said estimating means changes the restriction on the gradient of the gray axis in accordance with a designation by said designating means.

7. An image processing device according to claim 3, wherein said estimating means changes the restriction on the gradient of the gray axis in accordance with type of the photographic film.

8. An image processing device according to claim 3, wherein said estimating means changes the restriction on the gradient of the gray axis in accordance with exposure level at which the original image has been recorded by exposing the photographic film.

9. An image processing method comprising the steps of:
(a) on the basis of image data expressing a single original image recorded on a photographic film, determining an image characteristic value of the original image and, on the basis of the determined image characteristic value, extracting from the image data gray candidate pixels which have a high possibility of being pixels corresponding to gray portions of an object, said determination and extraction being carried out for each of a plurality of original images recorded on the photographic film; and
(b) estimating gray balance on the basis of distribution on a predetermined coordinate system of a group of gray candidate pixels which group comprises the gray candidate pixels respectively extracted from the plurality of original images.

10. An image processing method according to claim 9, wherein, in said step (b), for each of the plurality of original images, by subjecting, among the distribution of the group of gray candidate pixels on the predetermined coordinate system, a distribution in a density area of an original image, which is an object of estimation, to linear approximation, a gray axis expressing the gray balance in the original image is estimated.

11. An image processing method according to claim 10, wherein, in said step (b), the linear approximation is carried out in such a manner that gradient of the gray axis is within a predetermined range.

12. An image processing method according to claim 11, wherein, in said step (b), the restriction on the gradient of the gray axis is changed in accordance with the number of the original images recorded on the photographic film.

13. An image processing method according to claim 11, wherein, in said step (b), the restriction on the gradient of the gray axis is changed in accordance with the number of the gray candidate pixels extracted from the image data.

14. An image processing method according to claim 11, further comprising the designation step for designating the restriction on the gradient of the gray axis, wherein, in said step (b), the restriction on the gradient of the gray axis is changed in accordance with a designation performed in said designation step.

15. An image processing method according to claim 11, wherein, in said step (b), the restriction on the gradient of the gray axis is changed in accordance with type of the photographic film.

16. An image processing method according to claim 11, wherein, in said step (b), the restriction on the gradient of the gray axis is changed in accordance with exposure level at which the original image has been recorded by exposing the photographic film.

17. A recording medium on which is recorded a program for a computer to execute processings comprising:
a first step in which, on the basis of image data expressing a single original image recorded on a photographic film, an image characteristic value of the original image is determined and, on the basis of the determined image characteristic value, gray candidate pixels which have a high possibility of being pixels corresponding to gray portions of an object are extracted from the image data, said determination and extraction being carried out for each of a plurality of original images recorded on the photographic film; and
a second step in which gray balance is estimated on the basis of distribution of a group of gray candidate pixels on a predetermined coordinate system which group comprises the gray candidate pixels respectively extracted from the plurality of original images.

18. An image processing device, comprising:
an extractor which, on the basis of image data expressing a single original image recorded on a photographic film, determines an image characteristic value of the original image and, on the basis of the determined image characteristic value, extracts from the image data gray candidate pixels which have a high possibility of being pixels corresponding to gray portions of an object, said determination and extraction being carried out for each of a plurality of original images recorded on the photographic film; and
an estimating device for estimating gray balance on the basis of distribution of a group of gray candidate pixels on a predetermined coordinate system which group comprises the gray candidate pixels respectively extracted from the plurality of original images by said extractor.

* * * * *